US012415353B2

(12) United States Patent
Matsufuji

(10) Patent No.: US 12,415,353 B2
(45) Date of Patent: Sep. 16, 2025

(54) LIQUID DISCHARGE HEAD AND LIQUID DISCHARGE APPARATUS

(71) Applicant: Ryohta Matsufuji, Kanagawa (JP)

(72) Inventor: Ryohta Matsufuji, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 148 days.

(21) Appl. No.: 18/389,222

(22) Filed: Nov. 14, 2023

(65) Prior Publication Data

US 2024/0165949 A1 May 23, 2024

(30) Foreign Application Priority Data

Nov. 17, 2022 (JP) ................................ 2022-183873

(51) Int. Cl.
*B41J 2/14* (2006.01)
*B41J 2/175* (2006.01)

(52) U.S. Cl.
CPC ....... *B41J 2/14201* (2013.01); *B41J 2/17596* (2013.01)

(58) Field of Classification Search
CPC .. B41J 2/14201; B41J 2/1433; B41J 2/17596; B41J 3/4073; B41J 2202/05; B41J 2202/12; B41J 2002/14362
See application file for complete search history.

(56) References Cited

U.S. PATENT DOCUMENTS 5,144,332 A 9/1992 Okuie
5,467,899 A * 11/1995 Miller .................. G01F 11/022 222/340
9,346,075 B2 * 5/2016 Aguilar ................ B05C 5/0291
2004/0263579 A1 12/2004 Matsufuji et al.
2006/0044364 A1 3/2006 Tobita et al.
2006/0197809 A1 9/2006 Tobita et al.
2010/0328409 A1 12/2010 Matsufuji et al.
2013/0038651 A1 2/2013 Satou et al.
2015/0077469 A1 3/2015 Kohda et al.
(Continued)

FOREIGN PATENT DOCUMENTS

JP S63-303750 A 12/1988
JP H04-022641 A 1/1992
(Continued)

OTHER PUBLICATIONS

Extended European Search Report issued Mar. 15, 2024 in European Patent Application No. 23207163.9, 5 pages.

*Primary Examiner* — Anh T Vo
(74) *Attorney, Agent, or Firm* — XSENSUS LLP

(57) ABSTRACT

A liquid discharge head includes a nozzle plate, a first housing, a valve body, and a second housing. The nozzle plate has a nozzle from which a liquid is dischargeable. The first housing has a first face fixed to the nozzle plate and has a liquid chamber communicating with the nozzle to supply the liquid to the nozzle. The valve body is movable between a liquid supply position and a liquid block position in a valve moving direction. The second housing is disposed over a second face of the first housing opposite to the first face in the valve moving direction. The second housing is deformable relative to the first housing. The second housing includes a fixing portion to be secured to a support of a liquid discharge apparatus to support the liquid discharge head.

14 Claims, 16 Drawing Sheets

(56) References Cited

U.S. PATENT DOCUMENTS

| | | | | |
|---|---|---|---|---|
| 2016/0176196 | A1 | 6/2016 | Guidotti et al. | |
| 2017/0120585 | A1 | 5/2017 | Matsufuji | |
| 2017/0129245 | A1 | 5/2017 | Kohda et al. | |
| 2018/0178224 | A1* | 6/2018 | Nakamura | B05B 1/086 |
| 2018/0178533 | A1* | 6/2018 | Sakai | B22F 12/53 |
| 2018/0290446 | A1 | 10/2018 | Kohda et al. | |
| 2020/0171828 | A1 | 6/2020 | Matsufuji et al. | |
| 2020/0290352 | A1 | 9/2020 | Akiyama et al. | |
| 2022/0379609 | A1 | 12/2022 | Matsufuji et al. | |
| 2023/0302799 | A1 | 9/2023 | Fujita et al. | |

FOREIGN PATENT DOCUMENTS

| | | | |
|---|---|---|---|
| JP | H06-179262 | A | 6/1994 |
| JP | 2004-142382 | A | 5/2004 |
| JP | 2010-241003 | A | 10/2010 |
| JP | 2021-151767 | A | 9/2021 |
| JP | 2022-069799 | A | 5/2022 |

* cited by examiner

FIG. 1 COMPARATIVE EXAMPLE

FIG. 2 COMPARATIVE EXAMPLE

FIG. 4A COMPARATIVE EXAMPLE
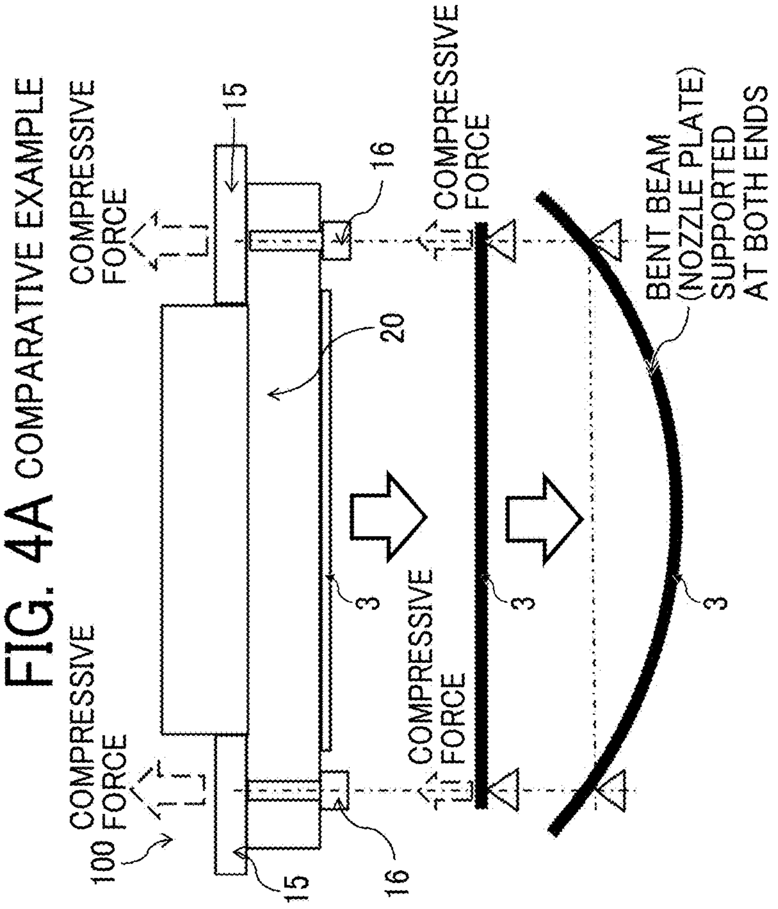
FIG. 4B COMPARATIVE EXAMPLE
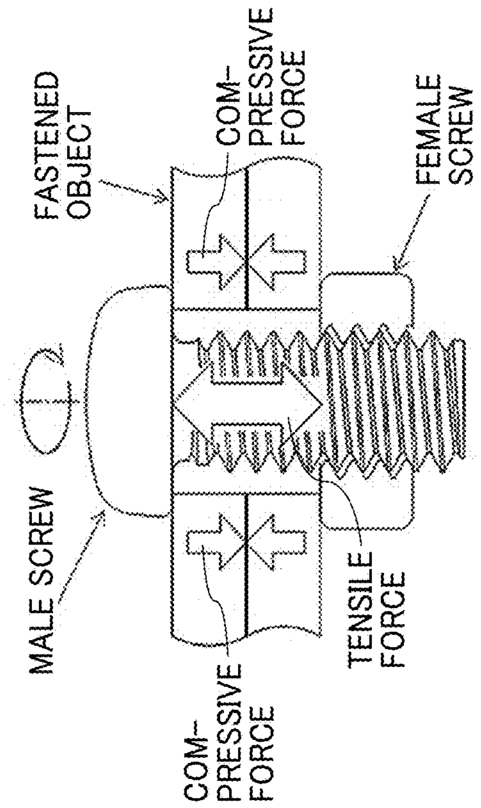
FIG. 4C COMPARATIVE EXAMPLE
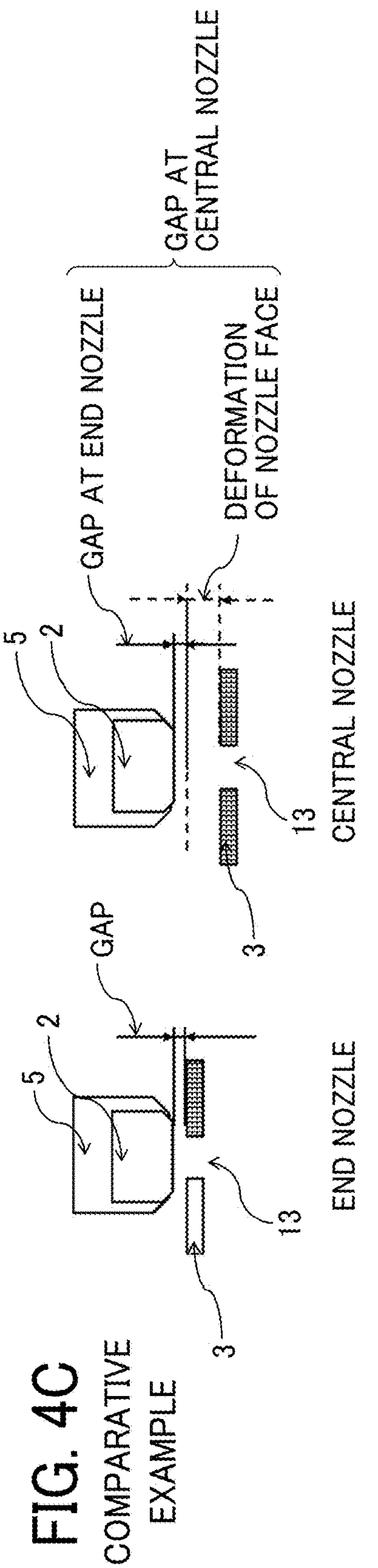

LIQUID DISCHARGE HEAD AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-183873, filed on Nov. 17, 2022, in the Japan Patent Office, the entire disclosure of which is hereby incorporated by reference herein.

BACKGROUND

Technical Field

Embodiments of the present disclosure relate to a liquid discharge head and a liquid discharge apparatus.

Related Art

In the related art, a liquid discharge head discharges droplets of liquid from a nozzle. The liquid discharge head includes a needle valve, a nozzle opening-closing driver (i.e., an actuator), and a nozzle opening-closing controller. The needle valve serving as a nozzle body is provided for the nozzle. The needle valve pressurizes the liquid to be discharged and supplies the liquid to the nozzle. The nozzle opening-closing driver moves the needle valve toward and away from the nozzle. The nozzle opening-closing controller controls the nozzle opening-closing driver to open and close the nozzle to discharge the droplets of the liquid from the nozzle. Such a liquid discharge head is already known as a so-called liquid discharge head of valve opening-closing type.

SUMMARY

Embodiments of the present disclosure describe an improved liquid discharge head that includes a nozzle plate, a first housing, a valve body, and a second housing. The nozzle plate has a nozzle from which a liquid is dischargeable. The first housing has a first face fixed to the nozzle plate and has a liquid chamber communicating with the nozzle to supply the liquid to the nozzle. The valve body is movable between a liquid supply position and a liquid block position in a valve moving direction. The valve body at the liquid supply position separated from the nozzle allows the liquid flowing from the liquid chamber to the nozzle. The valve body at the liquid block position contacting the nozzle blocks the liquid flowing from the liquid chamber to the nozzle. The second housing is disposed over a second face of the first housing opposite to the first face in the valve moving direction. The second housing is deformable relative to the first housing. The second housing includes a fixing portion to be secured to a support of a liquid discharge apparatus to support the liquid discharge head.

According to another embodiment of the present disclosure, there is provided a liquid discharge head that includes a nozzle plate, a first housing, a valve body, a second housing, and a third housing. The nozzle plate has a nozzle from which a liquid is dischargeable. The first housing has a first face fixed to the nozzle plate and has a liquid chamber communicating with the nozzle to supply the liquid to the nozzle. The valve body is movable between a liquid supply position and a liquid block position in a valve moving direction. The valve body at the liquid supply position separated from the nozzle allows the liquid flowing from the liquid chamber to the nozzle. The valve body at the liquid block position contacting the nozzle blocks the liquid flowing from the liquid chamber to the nozzle. The second housing is disposed over a second face of the first housing opposite to the first face in the valve moving direction. The second housing includes a fixing portion to be secured to a support of a liquid discharge apparatus to support the liquid discharge head. The third housing is disposed opposite the first housing via the second housing in the valve moving direction. The third housing includes a holder holding the valve body. The first housing and the second housing are fastened to the third housing. The second housing is deformable relative to the first housing and the third housing.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 4A to 4C are diagrams each illustrating the deformation of a nozzle face, by fastening, of the discharge head illustrated in FIG. 1;

Figure 1:
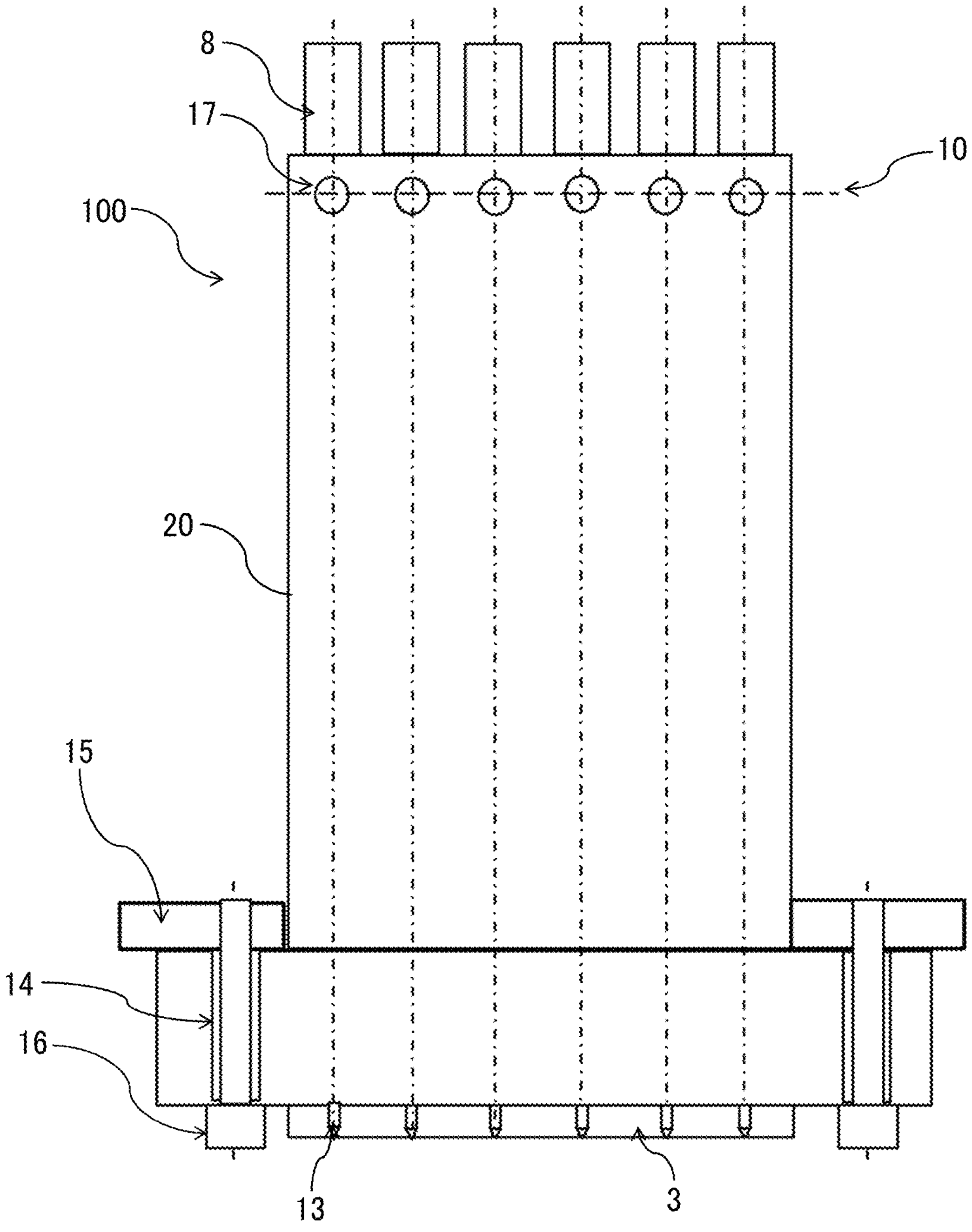
FIG. 1 is a schematic view of a discharge head according to a comparative example.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the following description, a liquid discharge head is referred to as a discharge head, and a liquid discharge unit is referred to as a discharge unit. A configuration to be compared (comparative example) is described below, and the background of the present disclosure is described based on the configuration.

COMPARATIVE EXAMPLE

Figure 2:
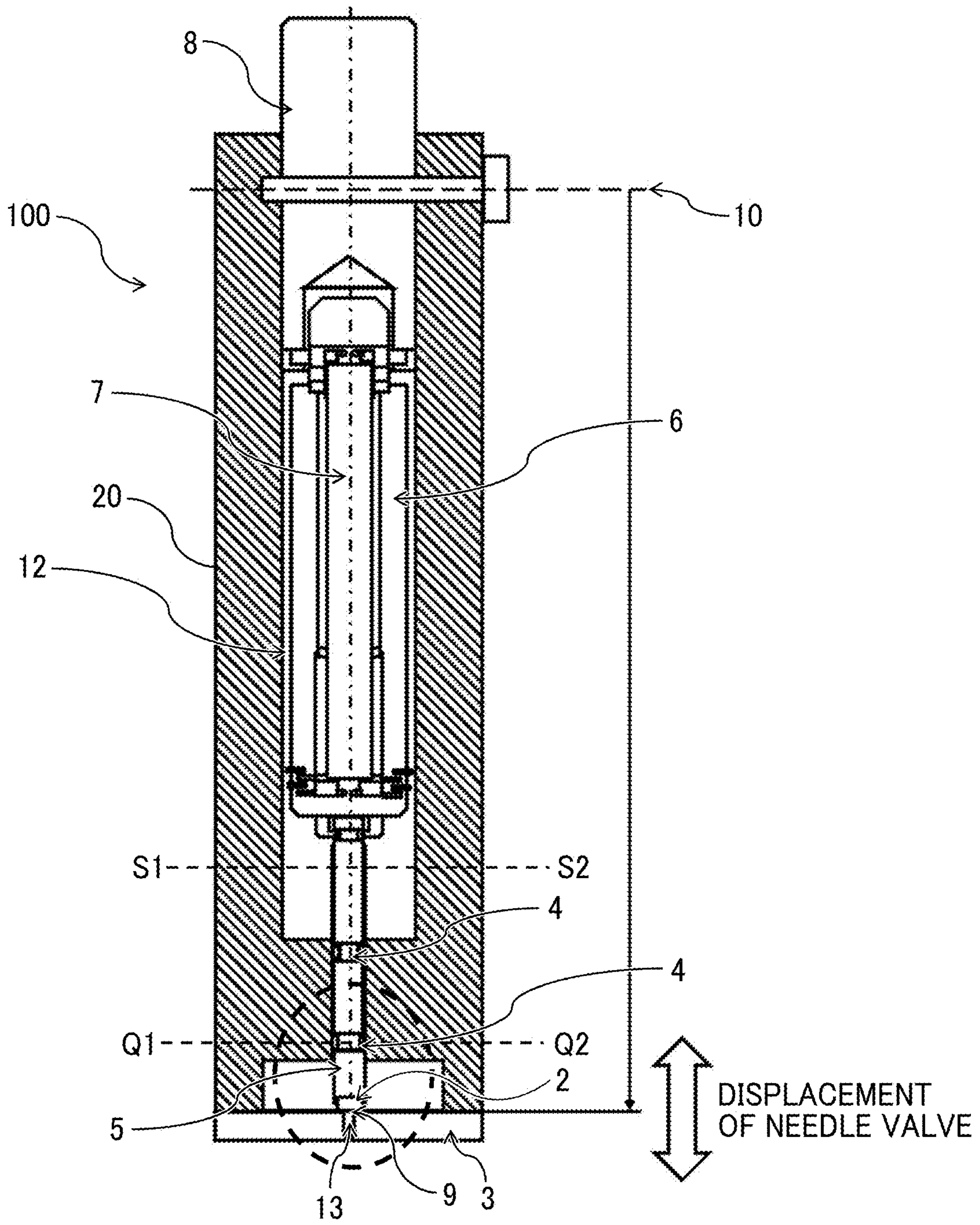
FIG. 2 is a diagram illustrating a configuration of the discharge head illustrated in FIG. 1.
Figure 3:
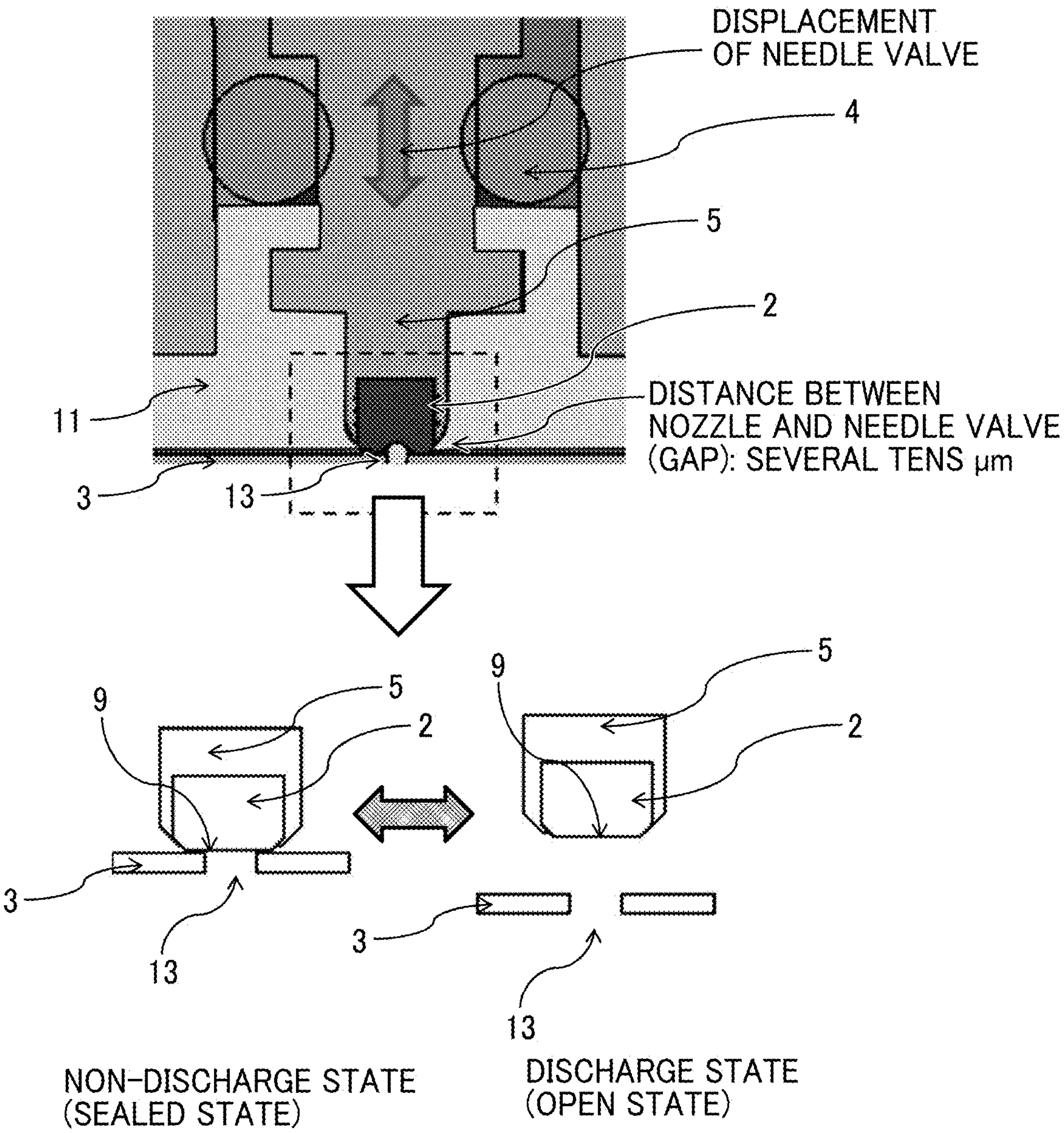
FIG. 3 is a diagram illustrating the relative positions between a nozzle and a needle valve of the discharge head illustrated in FIG. 1.

FIG. 1 is a schematic view of a discharge head according to a comparative example. FIG. 2 is a diagram illustrating a configuration of the discharge head. Broken lines Q1-Q2 and S1-S2 in FIG. 2 are dividing lines for separating (dividing) a housing of a discharge head according to an embodiment of the present disclosure, which is described later. FIG. 3 is an enlarged view of a nozzle and a needle valve in the configuration of the discharge head, illustrating the relative positions between the nozzle and the needle valve. FIG. 3 is also the enlarged view of a portion surrounded by the dashed circle in FIG. 2.

A discharge head 100 includes a nozzle plate 3, a liquid chamber 11, a needle valve 5, a piezoelectric element 7, and a housing 20. The nozzle plate 3 has a nozzle 13 from which ink is discharged. The liquid chamber 11 supplies pressurized ink to the nozzle 13. The needle valve 5 is disposed in the liquid chamber 11 to open and close a hole of the nozzle 13. The piezoelectric element 7 drives the needle valve 5. The housing 20 has a piezoelectric element accommodating space 12 to accommodate the piezoelectric element 7. The ink serves as a liquid, the nozzle 13 is a nozzle according to the present embodiment, the needle valve 5 is a valve body according to the present embodiment, and the piezoelectric element 7 is a mover according to the present embodiment. An O-ring 4 as a sealer is disposed between the needle valve 5 in the liquid chamber 11 and the housing 20 to prevent ink from reaching the piezoelectric element 7 from the liquid chamber 11.

The nozzle plate 3 is joined to a portion of the housing 20 defining the liquid chamber 11. The needle valve 5 contacts the nozzle 13 of the nozzle plate 3 so as to close the nozzle 13. A seal 9 is disposed in a tip insertion portion 2 of the needle valve 5. The needle valve 5 is displaced as the piezoelectric element 7 is driven. As a result, the displaced needle valve 5 presses the seal 9 against the nozzle plate 3 to close the nozzle 13. Examples of the seal 9 include an elastic body such as resin (fluororesin) and rubber.

The piezoelectric element 7 is coupled to a piezoelectric element fixing member 8 and the needle valve 5 via a piezoelectric element holder 6, and is secured to the housing 20 via the piezoelectric element fixing member 8. The piezoelectric element holder 6 holds the piezoelectric element 7 therein and also serves as a holder that holds the needle valve 5. The piezoelectric element 7 is deformed relative to a fixed reference point 10, which does not move, to displace the needle valve 5. With the above-described configuration, the pressurized liquid is discharged when the piezoelectric element 7 moves the needle valve 5 away from the nozzle 13. A discharge head may have multiple nozzles arranged in a row as illustrated in FIG. 1 to discharge liquid from the multiple nozzles. FIG. 1 illustrates the discharge head 100 having, for example, six-channel (ch) nozzles 13.

As illustrated in FIG. 3, the needle valve 5 contacts the nozzle 13 and separates from the nozzle 13 by several to several tens of μm which is extremely small. In the present disclosure, the distance between the needle valve 5 and the nozzle 13 is referred to as a gap. In the present embodiment, the gap between the nozzle 13 and the needle valve 5 is set to, for example, 5 to 50 μm.

Figure 9:
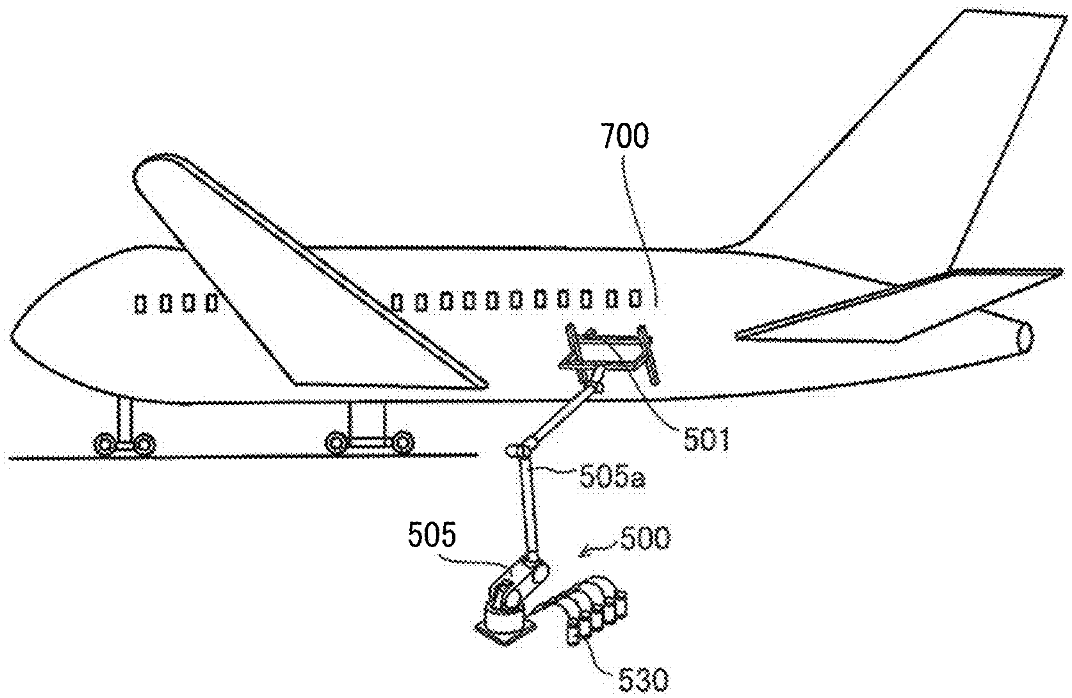
FIG. 9 is a schematic view of a liquid discharge apparatus according to embodiments of the present disclosure, which prints an image on a print object such as an aircraft.
Figure 11:
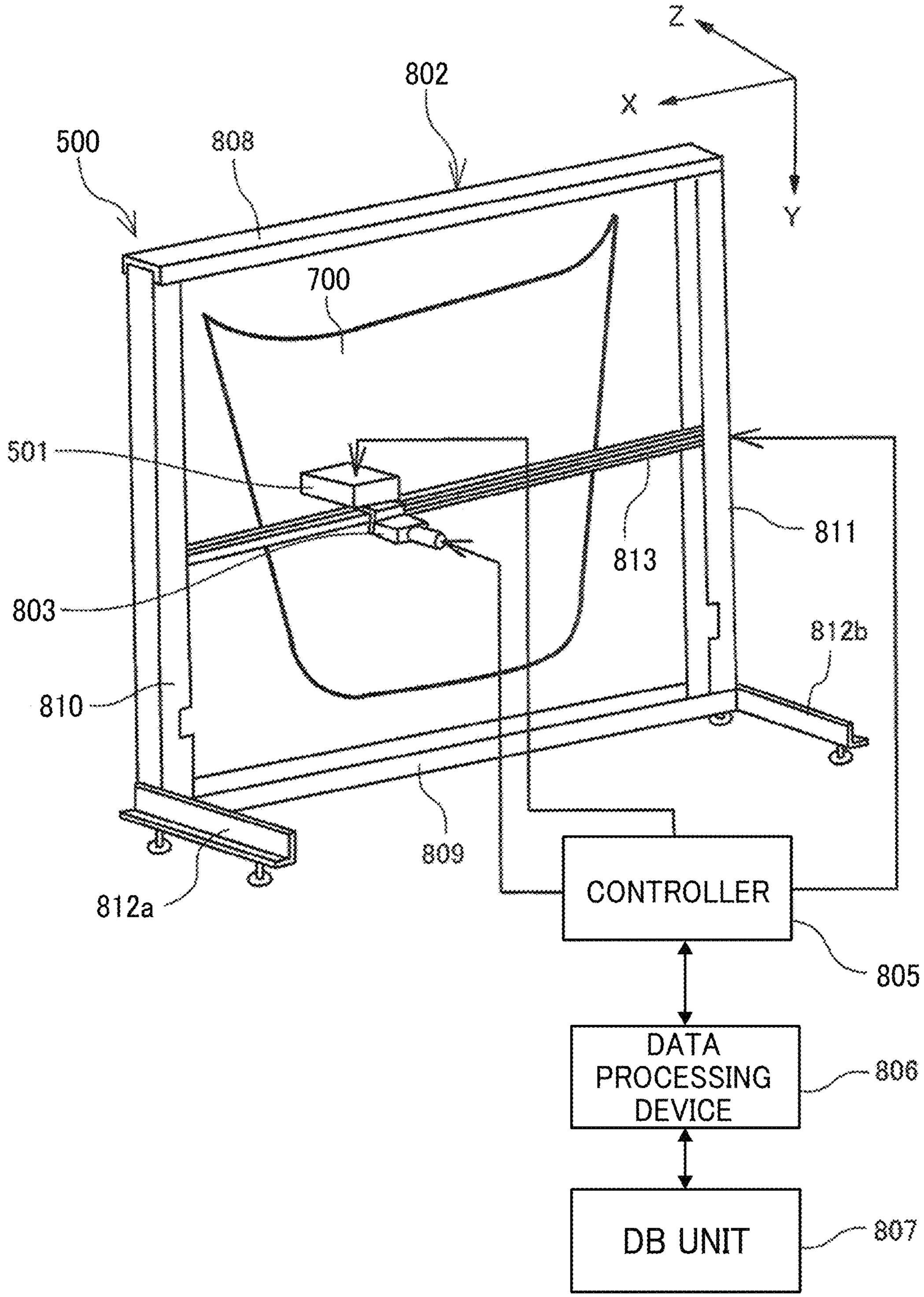
FIG. 11 is a schematic perspective view of another liquid discharge apparatus according to embodiments of the present disclosure.
Figure 13:
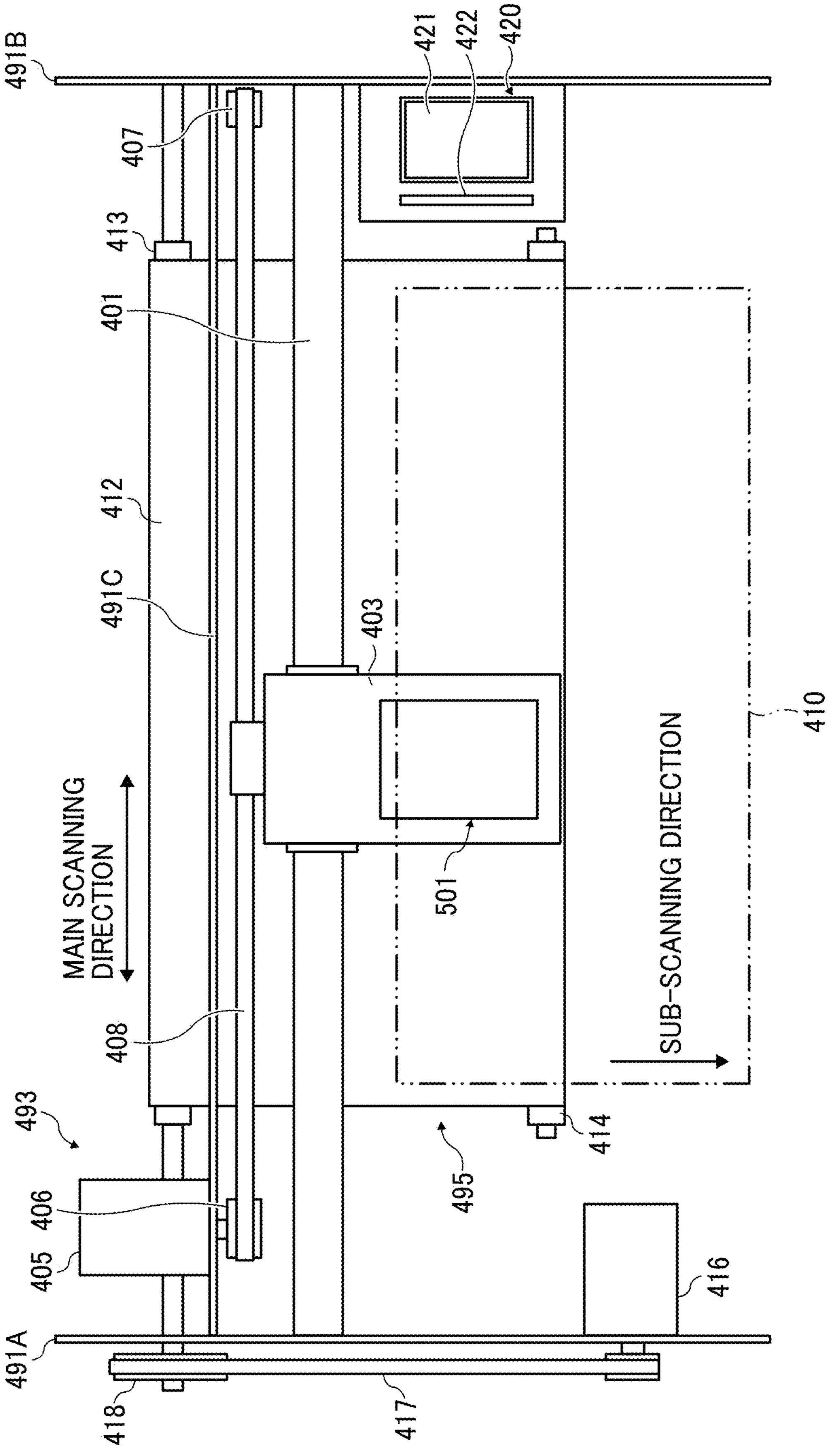
FIG. 13 is a schematic plan view of yet another liquid discharge apparatus according to embodiments of the present disclosure.

When the discharge head 100 is mounted on a liquid discharge apparatus 500 illustrated in FIG. 9, 11, or 13, the discharge head 100 is attached to, for example, a carriage 403 or a movable unit to construct a discharge unit 501. The carriage 403 (the attachment plate 15) is a discharge head support (or a support) according to the present embodiment, which supports the discharge head 100 to move the discharge head 100 to an object onto which liquid is discharged. Screws 16 are screwed into an attachment plate 15 through screw holes 14 formed in the housing 20 to fasten the discharge head 100 to the carriage 403. The liquid discharge apparatus 500 and the carriage 403 are described in detail later.

Relation Between Discharging Performance and Gap Between Nozzle and Valve Body

A relation between discharging performance and the gap between the nozzle and the valve body is described below. For example, a liquid discharge head of valve opening-closing type includes a needle valve, a nozzle opening-closing driver (i.e., an actuator), and a nozzle opening-closing controller. The needle valve as a valve body is provided for the nozzle. The needle valve pressurizes liquid to be discharged from the nozzle and supplies the liquid to the nozzle. The nozzle opening-closing driver moves the needle valve toward and away from the nozzle. The nozzle opening-closing controller controls the nozzle opening-closing driver to open and close the nozzle to discharge the droplets of the liquid from the nozzle.

Typically, factors such as the pressure applied to the liquid and the gap affect the fluid resistance caused by supplying the liquid and the liquid discharge according to the opening-closing time of the needle valve. In particular, the gap greatly affects the discharge speed and the discharge amount of the liquid, which are included in the discharging performance.

A liquid discharge head of valve opening-closing type uses the piezoelectric element to move the needle valve to open and close the nozzle. In a comparative example, the liquid discharge head has a configuration in which a housing, to which the nozzle plate is attached, is secured as a single body. The nozzle plate having the nozzles is secured to one end of the housing, and a needle including the needle valve, the piezoelectric element, and the piezoelectric element holder is secured to the other end (i.e., a fixed point) of the housing opposite to a nozzle face of the nozzle plate secured to the one end. At this time, the piezoelectric element is controlled so as to expand and contract relative to the fixed point as a reference position. As a result, the needle valve moves to open and close the nozzle to discharge liquid. The liquid discharge head of valve opening-closing type using the piezoelectric element can open and close the nozzle at a high drive frequency. The positional accuracies of the nozzle face and the reference position of the needle significantly affect the discharging performance. The reference position for assembling the needle at the initial position is determined while the amount of leakage from the needle and the positional accuracy are strictly measured. The needle is assembled at the initial position with high accuracy of sub-micrometer order or less.

When the gap varies, the fluid resistance and the discharging performance vary. When such variations occur, a target discharge amount of liquid may not be obtained. If the gap between the nozzle and the needle valve is large when the needle valve moves to open the nozzle, the discharge speed and the discharge amount of liquid are large. In other words, the discharge speed and the discharge amount of liquid increase with an increase in the distance between the nozzle and the needle valve (i.e., the gap). On the other hand, if the gap between the nozzle and the needle valve is small when the needle valve moves to open the nozzle, the discharge speed and the discharge amount of liquid are small. For example, when the housing shrinks, the gap becomes small and the fluid resistance becomes large. As a result, the discharge speed becomes slow and the target discharge amount may not be obtained. When the positions of the nozzle and the reference point of the needle change, the gap varies and the fluid resistance varies. Accordingly, the discharge speed varies.

In embodiments of the present disclosure, changes in the positions of the nozzle and the reference point of the needle are reduced to reduce variations in the discharging performance.

Attachment Method to Discharge Unit

When the discharge head of valve opening-closing type using the piezoelectric element to discharge liquid is attached to the liquid discharge apparatus, the fluid resistance between the nozzle and the needle valve may vary due to changes in the positions of the reference point of the nozzle and the reference point of the needle valve in a gap direction between the nozzle and the needle valve. The gap direction in which the needle valve moves may be referred to as an opening-closing direction, a separating-contacting direction, or a valve moving direction. As a result, the discharge speed and the discharge amount vary. The present disclosure has an object to provide a discharge head that reduces such variations. To implement the configuration of the discharge head, a method of mounting the discharge head of valve opening-closing type on the liquid discharge apparatus is considered in order to reduce the changes in the positions of the nozzle and the reference point of the needle valve after assembly.

When the discharge head of valve opening-closing type is mounted on the liquid discharge apparatus, the discharge head is attached to, for example, a carriage or a movable unit to move the discharge head to an object onto which liquid is discharged to construct a discharge unit. Examples of the method of attaching the discharge head to the carriage or the movable unit include bonding, fitting, and fastening. The method of attaching the discharge head affects the accuracy of the position and posture of the discharge head relative to the carriage, for example, and thus affects the accuracy of the position of the nozzle relative to the object onto which liquid is discharged and the accuracy of the discharge direction of the liquid. The most appropriate method is considered below among the three methods of attaching the discharge head listed above. This is because the positional accuracy of the nozzle relative to the surface of the object onto which liquid is discharged significantly affects image quality as well as the discharge speed and the discharge amount of the liquid.

Attachment by bonding does not allow replacement of the discharge head. For this reason, this method is undesirable. Attachment by fitting has backlash which causes vibrations of the discharge head. Accordingly, this method is undesirable because the position of the discharge head may be shifted due to the vibrations. In addition to the above, the attachment by bonding or fitting may not arrange the nozzle at an accurate position.

On the other hand, attachment by fastening using, for example, screws does not cause the above-described situations, and the discharge head can be secured while the position of the nozzle is being checked. For this reason, the fastening using, for example, screws is most desirable. For this reason, the discharge head is typically attached to the carriage or the movable unit by fastening with, for example, screws.

In the above description, the discharge head is attached to the carriage or the movable unit of the liquid discharge apparatus. Alternatively, the discharge head may be fixed to a head attachment held by the liquid discharge apparatus, and an object may be moved.

Attachment by Fastening

However, the fastening with screws causes an external force applied to the housing of the discharge head. As a result, the housing may be deformed. Such a deformation is described below.

FIGS. 4A to 4C are diagrams each illustrating the deformation of the nozzle face, by fastening, of the discharge head. The attachment by fastening with screws in the configuration of the inkjet discharge head according to the comparative example is described below. In such a configuration, a compressive force is applied to the vicinity of a fastening portion of the discharge head by fastening with screws. As a result, the housing (the nozzle plate) may be bent like a bent beam supported at both ends. When the carriage or the movable unit has low flatness at both left and right ends, the housing may be bent asymmetrically. As illustrated in FIGS. 4A to 4C, when the discharge head is fastened at both ends in a nozzle array direction, the housing is deformed such that the gap of the nozzle in the vicinity of the fastening portion (i.e., an end nozzle) when the nozzle is open is small, and the discharge speed and the discharge amount of liquid discharged from the end nozzle are small. On the other hand, the gap of the nozzle in the central portion (i.e., a central nozzle) when the nozzle is open is large, and the discharge speed and the discharge amount of liquid discharged from the central nozzle are large.

FIG. 4A is a diagram illustrating the deformation of the housing when the discharge head is attached to the attachment plate of the carriage. FIG. 4B is a diagram illustrating force applied to the housing by fastening. FIG. 4C is a diagram illustrating a difference in the gap between the end nozzle and the central nozzle. As illustrated in FIG. 4A, when the discharge head is attached to the carriage, a compressive force from the screw is applied to the housing. As a result, the housing is deformed like a bent beam supported at both ends, and the nozzle face is also deformed along with the deformation of the housing. At this time, the deformation of the nozzle face is small at the position of the end nozzle. On the other hand, the deformation of the nozzle face is large at the position of the central nozzle. Accordingly, the gap between the nozzle and the needle valve changes more at the position of the central nozzle than at the position of the end nozzle. As a result, as illustrated in FIG. 4C, the gap of the central nozzle is larger than the gap of the end nozzle by the amount of deformation of the nozzle face. For this reason, the discharge speed of liquid from the central nozzle is faster than the discharge speed of liquid from the end nozzle, and the discharge amount of liquid from the central nozzle is larger than the discharge amount of liquid from the end nozzle. As described above, when the discharge head is attached to the attachment plate of the carriage, the deformation of the nozzle face causes the discharge speed and the discharge amount of liquid to vary between the end nozzle and the central nozzle, which affects the image quality.

FEATURES OF EMBODIMENT OF PRESENT DISCLOSURE

As described above, the nozzle face is bent by the screws fastening the discharge head, and the gap between the nozzle and the needle valve varies in the nozzle array direction in which multiple needle valves are arranged. According to embodiments of the present disclosure, the housing is divided into a first separated component that holds the nozzle plate having the nozzles, a second separated component having a screw fastened portion for securing the discharge head to the carriage, and a third separated component that secures a fixed shaft of the needle valve. Such division allows the second separated component to be deformable relative to the first separated component and the third separated component. Accordingly, even when the second separated component having the screw fastened portion is deformed by the compressive force of screw fastening, such division can prevent the nozzle face from being bent and the position of the reference point of the fixed shaft of the needle valve from varying. As a result, the variations in the discharging performance (e.g., the discharge speed and the discharge amount) can be reduced.

As described above, in the discharge head of valve opening-closing type, the gap between the nozzle and the needle valve greatly affects the discharging performance. For this reason, the relative positions between the nozzle and the needle valve are preferably maintained in an appropriate range. A discharge head that does not include a valve body is not required to maintain the relative positions between the nozzle and the needle valve. In embodiments of the present disclosure, the discharge head includes a separated component for attaching the discharge head in addition to the housing having the reference points of the nozzle and the needle valve so as not to change the positions of the reference points of the nozzle and the needle valve. As a result, the change in the positions of the reference points of the nozzle and the needle valve can be reduced and the gap can be maintained in the appropriate range.

With reference to the drawings, embodiments of the present disclosure are described in detail below.

First Embodiment

Figure 5:
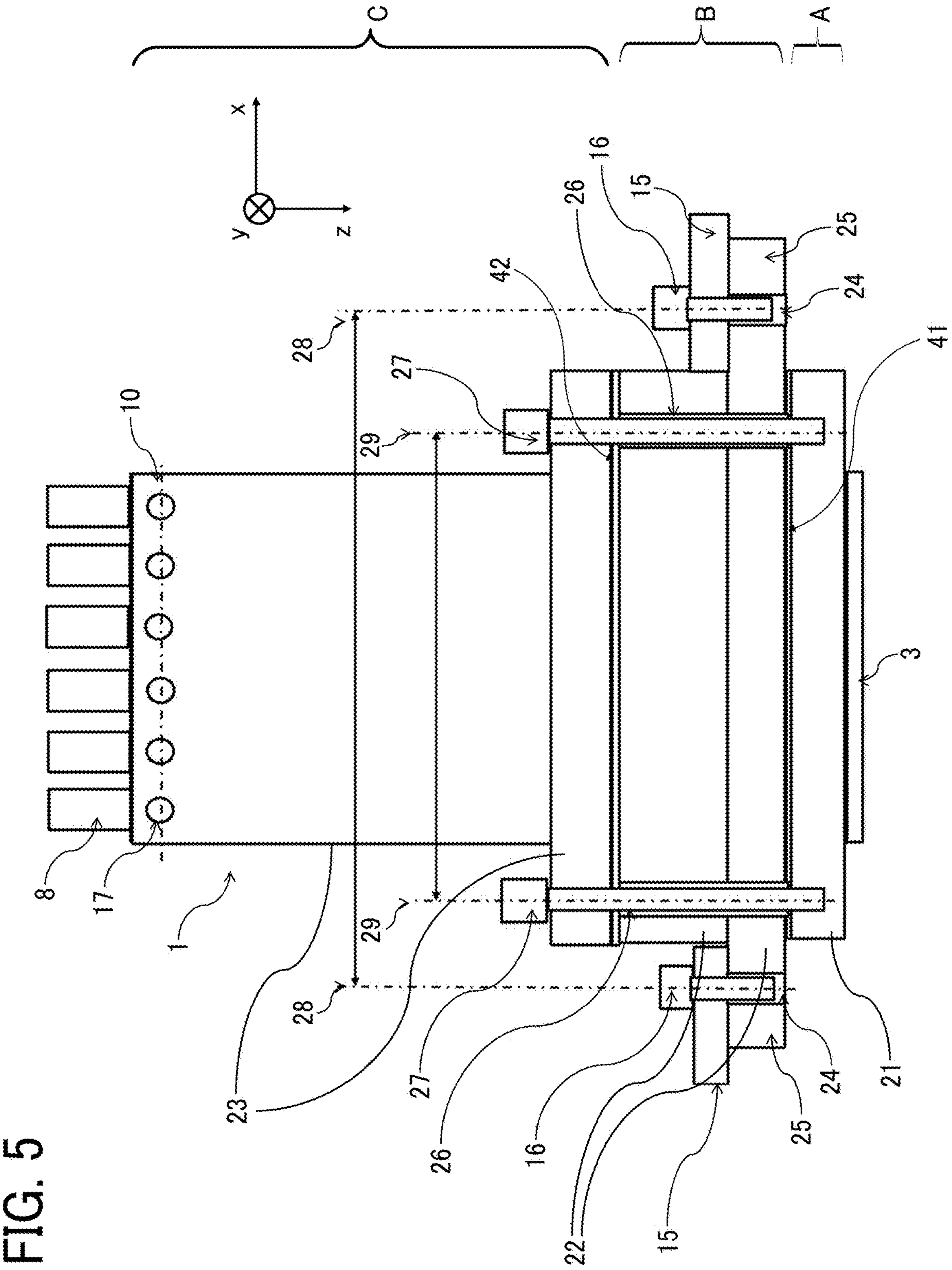
FIG. 5 is a schematic view of a discharge head according to a first embodiment of the present disclosure.

FIG. 5 illustrates a configuration of a discharge head 1 according to a first embodiment of the present disclosure. The horizontal direction in FIG. 5 is defined as an x direction, the direction perpendicular to the surface of the paper on which FIG. 5 is drawn is defined as a y direction, and the vertical direction in FIG. 5 is defined as a z direction. Unlike the housing 20 according to the comparative example, a housing of the discharge head 1 according to the present embodiment is divided into three components of a housing-A 21, a housing-B 22, and a housing-C 23. The housing-A 21 is a first housing according to an embodiment of the present disclosure, the housing-B 22 is a second housing according to an embodiment of the present disclosure, and the housing-C 23 is a third housing according to an embodiment of the present disclosure. The dividing position between the housing-A 21 and the housing-B 22 corresponds to the broken line Q1-Q2 in FIG. 2, and the dividing position between the housing-B 22 and the housing-C 23 corresponds to the broken line S1-S2 in FIG. 2. Fastening screws 27 are inserted into fastening screw holes-b 26 from the housing-C 23 toward the housing-A 21 to fastening the three housings (i.e., the housing-A 21, the housing-B 22, and the housing-C 23) to each other at housing-AC fastening positions 29. The fastening screw hole-b 26 at the housing-AC fastening position 29 is a held portion according to an embodiment of the present disclosure. The discharge head 1 according to the present embodiment and the discharge head 100 according to the comparative example basically have the same configuration except for the housings. Details of the three housings are described below.

A nozzle plate 3 is bonded to the housing-A 21 with an adhesive. Thus, the housing-A 21 holds the nozzle plate 3 having nozzles 13. The nozzle plate 3 may be joined to the housing-A 21 by fastening with screws or diffusion bonding. The fastening with screws may cause leakage of liquid, variations in flatness of the nozzle face due to interposing of a sealing member such as a gasket, and variations in the gap between a nozzle 13 and a needle valve 5. The joining by diffusion bonding, in which strain due to heat is generated, may cause variations of positional accuracy of the nozzle 13. For this reason, the housing-A 21 and the nozzle plate 3 are preferably bonded to each other with an adhesive.

The housing-B 22 is disposed adjacent to the housing-A 21 in the z direction. The needle valve 5 is inserted into the housing-B 22 so that the housing-B 22 holds the needle valve 5. The housing-A 21 and the housing-B 22 are separated at a position corresponding to the broken line Q1-Q2 in FIG. 2. In the present embodiment. O-rings 4 are installed at two positions in the housing-B 22. If O-rings are installed in different housings, variations in the assembly of the housings may be generated. In the present embodiment, as described above, the housing is divided into the housing-A 21 and the housing-B 22 at the position corresponding to the broken line Q1-Q2 in FIG. 2 to install the two O-rings 4 in the housing-B 22 to prevent the variations in the assembly.

The housing-B 22 has fastening screw holes-B 24 into which screws 16 are screwed to attach the discharge head 1 to the attachment plate 15 of the carriage 403 at carriage fastening positions 28. The fastening screw hole-B 24 at the carriage fastening position 28 is a fixing portion according to an embodiment of the present disclosure. The housing-B 22 has a projecting portion 25 projecting in the x direction. The fastening screw hole-B 24 is disposed in the projecting portion 25. The projecting portion 25 is a projection according to an embodiment of the present disclosure. The rigidity of the projecting portion 25 is lower than the entire housing-B 22.

When the discharge head 1 is fastened to the attachment plate 15 of the carriage 403 by the screws 16 inserted into the fastening screw holes-B 24, the screws 16 are inserted in the z direction from the housing-C 23 toward the housing-A 21. In other words, the screws 16 are inserted into screw holes of the attachment plate 15 of the carriage 403 in the direction from the attachment plate 15 toward the projecting portion 25 of the housing-B 22 to fasten the attachment plate 15 with the screws 16 inserted into the fastening screw holes-B 24 of the housing-B 22. If the screws 16 are inserted from the nozzle 13 side to fasten the discharge head 1, the screws 16 may be corroded by the mist of liquid (e.g., paint) discharged from the nozzle 13. The above-described configuration prevents the corrosion of the screws 16. The screw hole of the attachment plate 15 may be a clearance hole.

Further, the housing-B 22 has the fastening screw holes-b 26 for securing and fastening the three housings to each other. The fastening screw hole-b 26 is a clearance hole. Accordingly, since the fastening screw hole-b 26 is a clearance hole, the housing-B 22 is held by the housing-A 21 and deformable relative to the housing-A 21, and is held by the housing-C 23 and deformable relative to the housing-C 23.

The housing-C 23 is disposed adjacent to the housing-B 22 in the z direction and has an inserted portion into which the needle valve 5 is inserted. The housing-C 23 has a fixed point fastening hole 17 to which the piezoelectric element fixing member 8 is secured to determine the fixed reference point 10. The piezoelectric element 7 is coupled to the piezoelectric element fixing member 8 via the piezoelectric element holder 6. The housing-AC fastening positions 29 are disposed inside the carriage fastening positions 28 in the direction (i.e., the x direction) orthogonal to the gap direction between the nozzle 13 and the needle valve 5.

The discharge head 1 according to the present embodiment does not include the housing 20, which is formed in a single body, of the discharge head 100 according to the comparative example, but includes the housing divided into three separate bodies (i.e., the housing-A 21, the housing-B 22, and the housing-C 23). The housing-B 22 is held by the housing-A 21 and the housing-C 23 and is deformable relative to the housing-A 21 and the housing-C 23. For this reason, when the discharge head 1 is attached to the attachment plate 15, deformation of the housing-B 22 due to the compressive force of the screws 16 fastening the discharge head 1 is less likely to be transmitted to the housing-A 21 and the housing-C 23 separated from the housing-B 22. This is because the deformation is about several μm and can be sufficiently absorbed by the division of the housing.

As a result, the deformation of the housing-A 21 and the housing-C 23 can be prevented. At this time, the rigidity of the housing-B 22 is preferably lower than the rigidity of the housing-A 21 and the housing-C 23.

Further, the housing-B 22 has the projecting portion 25 projecting in the x direction to reduce the rigidity of the portion corresponding to the projecting portion 25. Accordingly, only the attachment plate 15 is deformed. Thus, the deformation is prevented from being transmitted to the nozzle face of the housing-A 21 and the reference point 10 of the housing-C 23. As a result, the nozzle 13 and the reference point 10 can be prevented from changing the positions thereof.

The projecting portion 25 of the housing-B 22 is closer to the housing-A 21 than to the housing-C 23C in the z direction. This reason is described below. The projecting portion 25 is attached to the attachment plate 15 as described above. The projecting portion 25 close to the nozzle 13 in the housing-B 22 in the z direction is attached to the attachment plate 15 to position the discharge head 1 relative to the carriage 403. Such a configuration facilitates the accurate positioning of the nozzle 13 relative to the carriage 403. For example, when the housing-B 22 is thermally expanded due to temperature fluctuations of the discharge head 1, the projecting portion 25 of the housing-B 22 close to the nozzle 13 can prevent the influence of the thermal expansion of the housing-B 22. Even if the attachment plate 15 has insufficient accuracy of flatness and the discharge head 1 is inclined, the projecting portion 25 close to the nozzle 13 can reduce the positional deviation of the nozzle 13 in the x direction and the y direction. In addition, the lower joined face of the housing-B 22 with the housing-A 21 and the lower face of the projecting portion 25 are disposed on the same plane. Accordingly, a fixed face of the carriage 403 for fixing the discharge head 1 and the joined face of the housing-A 21 can be used as a reference surface, so that the accuracy is further enhanced.

As described above, the housing-AC fastening positions 29 are disposed inside the carriage fastening positions 28. This is because the rigidity of a fastened portion of the housing-B 22 with the housing-A 21 holding the nozzle plate 3 and the housing-C 23 holding the reference point 10 can be increased by screw fastening. In addition, deformation due to a force generated when the discharge head 1 is fastened to the carriage 403 can be reduced, and the relative positions between the nozzle 13 and the needle valve 5 can be kept uniform.

According to the present embodiment, a stress reliever 41 that serves as an elastic member or a first elastic member is disposed between the housing-A 21 and the housing-B 22, and a stress reliever 42 that serves as an elastic member or a second elastic member is disposed between the housing-B 22 and the housing-C 23. Accordingly, deformation due to a force generated when the discharge head 1 is fastened to the carriage 403 can be reduced by the stress relievers 41 and 42, and the relative positions between the nozzle 13 and the needle valve 5 can be kept uniform. The stress relievers 41 and 42 are, for example, an elastic body (e.g., a soft material such as rubber). With the above-described configuration, the position of the nozzle 13 and the position of the reference point 10 of the piezoelectric element 7 do not change when the discharge head 1 is attached to the carriage 403. As a result, a discharge head having less variations in the discharging performance of liquid (e.g., the discharge speed and the discharge amount) can be provided.

In the present embodiment, the configuration in which the housing-A 21 and the housing-B 22 are separated from each other and the housing-B 22 is deformable relative to the housing-A 21 is more effective than the configuration in which the housing-B 22 and the housing-C 23 are separated from each other in preventing the deformation due to the compressive force of the screw fastening from being transmitted and in maintaining the gap between the nozzle 13 and the needle valve 5. For this reason, the housing-A 21 and the housing-B 22 are separated from each other in the present embodiment.

The three housings (i.e., the housing-A 21, the housing-B 22, and the housing-C 23) are made of the same material, i.e., steel use stainless (SUS). Since the three housings made of the same material have the same linear expansion coefficient, the variations in the discharging performance of liquid are further reduced.

For example, it is assumed that the reference point of the bonding of the nozzle plate 3 deviates in the x direction and the y direction and the reference point 10 deviates in the x direction and the y direction. Even in such a case, the housing-A 21 holding the nozzle plate 3 having the nozzles 13 and the housing-C 23 holding the reference point 10 are separate components (separate bodies), and the positions of the housing-A 21 and the housing-C 23 can be adjusted based on the amount of the positional deviation in the x direction and the y direction obtained in advance to reduce the positional deviation between the nozzle 13 and the needle valve 5. The position adjustment in the x direction and the y direction affects the discharge direction of liquid which may be obliquely discharged. For this reason, the nozzle 13 and the needle valve 5 are coaxially matched in the present embodiment.

As described above, according to the present embodiment, the good quality of the discharge direction leads to the good quality of the landing position of liquid, and thus contributes to the good image quality.

The entire needle valve 5 is not accommodated in the housing-B 22, and a part of the needle valve 5 is accommodated in the housing-C 23. In the present embodiment, the needle valve 5 is secured in the housing-C 23 to determine the reference position. If the needle valve 5 is entirely accommodated in the housing-B 22, the fixed position of the needle valve 5 is the same as in the comparative example in which the housing 20 is not divided, which is not preferable. For this reason, the fixed position of the needle valve 5 is disposed in the housing-C 23 in the present embodiment.

Second Embodiment

Figure 6:
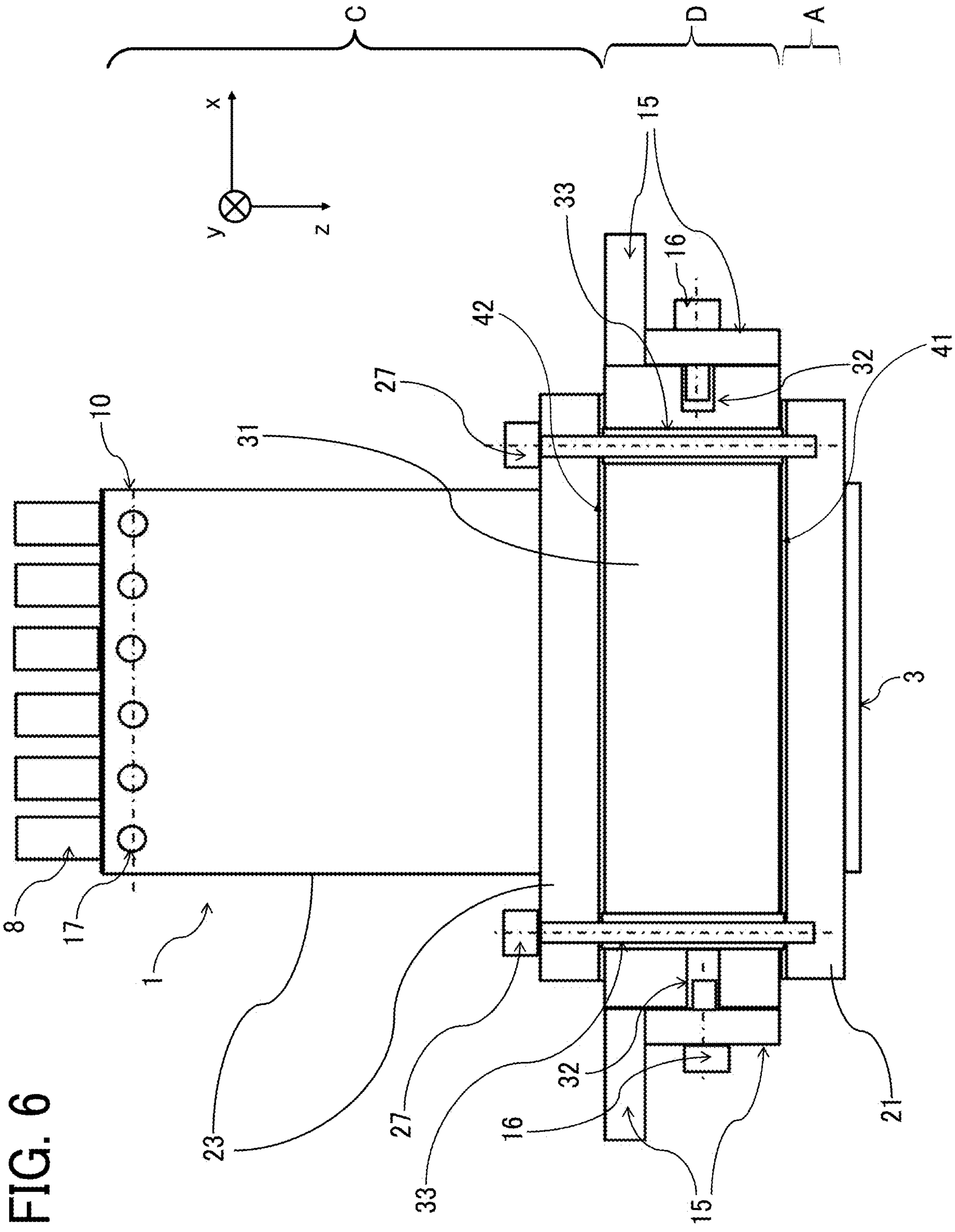
FIG. 6 is a schematic view of a discharge head according to a second embodiment of the present disclosure.

FIG. 6 illustrates a configuration of a discharge head 1 according to a second embodiment of the present disclosure. The horizontal direction in FIG. 6 is defined as the x direction, the direction perpendicular to the surface of the paper on which FIG. 6 is drawn is defined as they direction, and the vertical direction in FIG. 6 is defined as the z direction. A housing of the discharge head 1 according to the present embodiment is divided into three components of the housing-A 21, a housing-D 31 (a second housing according to an embodiment of the present disclosure), and the housing-C 23. In the present embodiment, the housing-A 21 and the housing-C 23 have the same configurations as those in the first embodiment, and the housing-D 31 is different from the housing-B 22. Thus, the configuration of the housing-D 31 is described below.

The housing-D 31 has fastening screw holes-D 32 into which the screws 16 are screwed to attach the discharge head 1 to the attachment plate 15 of the carriage 403. The fastening screw hole-D 32 is a fixing portion according to an embodiment of the present disclosure. The fastening screw hole-D 32 faces in a direction orthogonal to the nozzle 13 and the needle valve 5 (i.e., the x direction or a direction orthogonal to the gap direction between the nozzle 13 and the needle valve 5), which is different from the configuration in the first embodiment. Unlike the projecting portion 25 of the housing-B 22, for example, the portion where the fastening screw hole-D 32 is formed is not projecting from the housing-D 31. Further, the housing-D 31 has fastening screw holes-d 33 for securing and fastening the three housings to each other. The fastening screw hole-d 33 is a clearance hole. Accordingly, the configuration of the carriage 403 is different from that in the first embodiment. Specifically, a portion projecting from the housing-D 31 is not formed, and the attachment plate 15 of the carriage 403 has an L-shape (or an inverted L-shape) as viewed in the y direction. The fastening screw hole-D 32 is disposed on a face of the housing-D 31 facing in the x direction.

As described above, the fastening screw hole-D 32 faces in the x direction (i.e., the direction orthogonal to the gap direction between the nozzle 13 and the needle valve 5). Due to such a configuration, since the screws 16 fasten the attachment plate 15 of the carriage 403 to the fastening screw holes-D 32 in the x direction, the housing-D 31 is stretched in the x direction by fastening of the screws 16. Accordingly, since the housing-D 31 is not compressed by fastening of the screws 16, the housing-D 31 is less likely to be deformed (bent). As described above, the housing-D 31 is less likely to be deformed in the z direction (the gap direction of the nozzle face). As a result, the housing-A 21 is prevented from being deformed in the z direction (the gap direction of the nozzle face) and the reference point 10 of the housing-C 23 can be prevented from changing the position thereof. The screw hole of the attachment plate 15 is preferably a clearance hole. Such a configuration can reduce the load generated in the z direction or the y direction by the fastening force of the housing-D 31. As a result, the deformation of the nozzle face can be prevented. The configurations other than those described above are the same as those described in the first embodiment.

Third Embodiment

Figure 7:
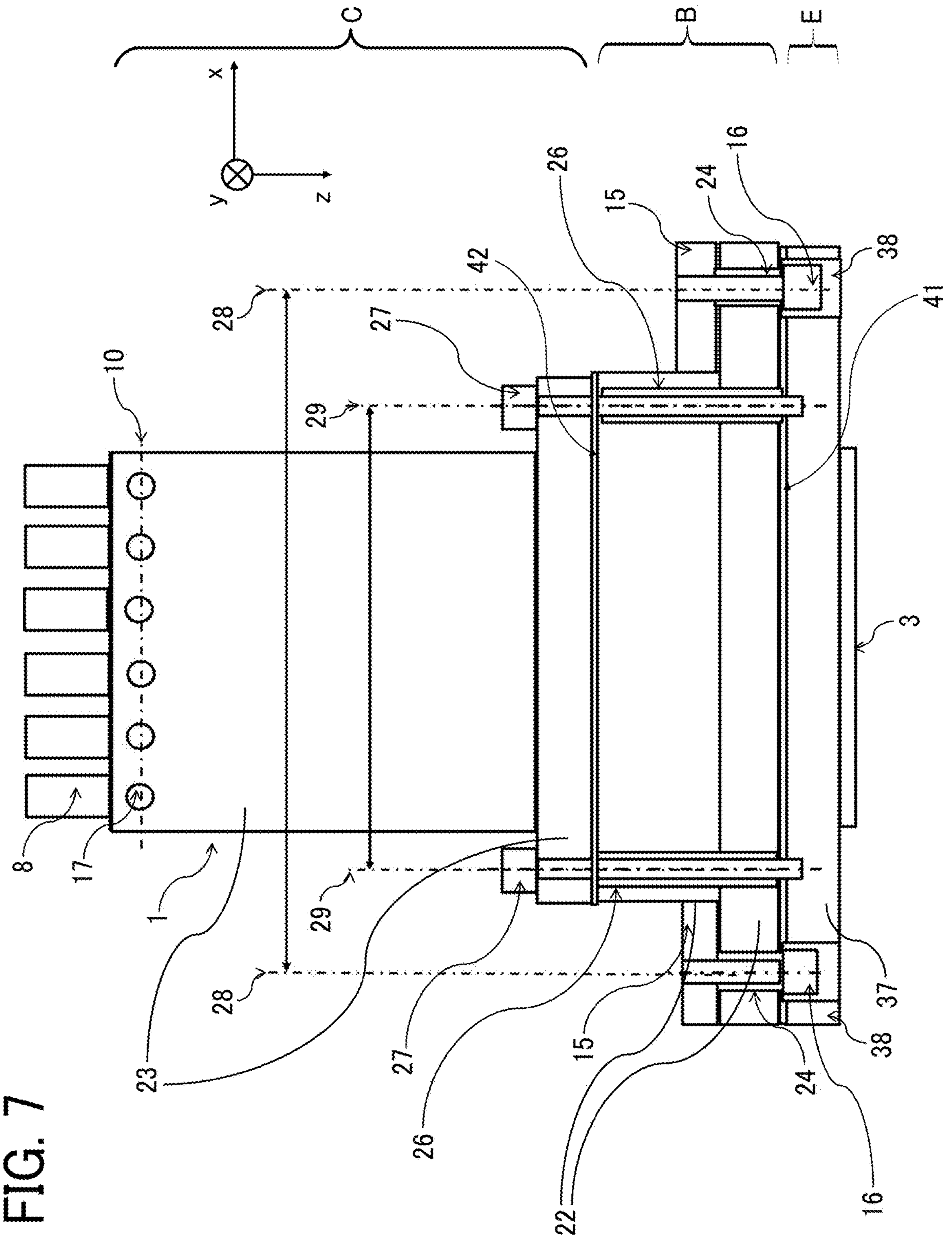
FIG. 7 is a schematic view of a discharge head according to a third embodiment of the present disclosure.

FIG. 7 illustrates a configuration of a discharge head 1 according to a third embodiment of the present disclosure. The horizontal direction in FIG. 7 is defined as the x direction, the direction perpendicular to the surface of the paper on which FIG. 7 is drawn is defined as the y direction, and the vertical direction in FIG. 7 is defined as the z direction. A housing of the discharge head 1 according to the present embodiment is divided into three components of a housing-E 37 (a first housing according to an embodiment of the present disclosure), the housing-B 22, and the housing-C 23. In the present embodiment, the housing-B 22 and the housing-C 23 have the same configurations as those in the first embodiment, and the housing-E 37 is different from the housing-A 21. Thus, the configuration of the housing-E 37 is described below.

The nozzle plate 3 is bonded to the housing-E 37 with an adhesive. Thus, the housing-E 37 holds the nozzle plate 3. The reason why the housing-E 37 and the nozzle plate 3 are preferably bonded to each other with an adhesive is the same as the reason described in the first embodiment. The housing-E 37 has screw holes-E 38 which are open toward the housing-B 22 at positions corresponding to the fastening screw holes-B 24 of the housing-B 22. The screw hole-E 38 is an opening according to an embodiment of the present disclosure, and the fastening screw hole-B 24 is the fixing portion of the housing-B 22. The screw hole-E 38 is a clearance hole. If the screw hole-E 38 is not a clearance hole, when the housing-E 37 is fastened, the housing-E 37 is deformed by the compressive force due to fastening. Thus, the above-described configuration prevents the deformation of the housing-E 37. Further, the housing-E 37 having the screw holes-E 38 is longer than the housing-A 21 in the first embodiment in the x direction (i.e., the direction orthogonal to the gap direction between the nozzle 13 and the needle valve 5). The screws 16 are inserted through the screw holes-E 38 from the nozzle 13 side, fitted into the fastening screw holes-B 24, and fastened into the screw holes of the attachment plate 15 to secure the housing-E 37 and the housing-B 22 to the attachment plate 15 of the carriage 403.

Due to such a configuration, when the discharge head 1 is attached to the liquid discharge apparatus, the screw 16 can be fastened from the nozzle 13 side while the position of the nozzle 13 is directly checked. The position of the nozzle 13 significantly affects the image quality. In the present embodiment, since the fastening position of the screw 16 and the nozzle face can be visually inspected in the same direction, the fastening of the screw 16 can be adjusted while the position of the nozzle 13 is checked. Accordingly, the positional accuracy of the nozzle 13 can be enhanced. As a result, the good positional accuracy of the nozzle 13 leads to the good quality of the landing position of liquid, and thus contributes to the good image quality. Further, since the fastening screw hole-B 24 is protected by the screw hole-E 38, the fastening screw hole-B 24 and the screw 16 are prevented from being stained with the liquid discharged from the nozzle 13.

Although the housing is divided into three separate bodies in the above-described embodiments, the present disclosure can be applied to another embodiment in which the housing is divided into four or more bodies. Embodiments of the present disclosure are effective for the valve opening-closing type including a valve body such as the needle valve 5.

Fourth Embodiment

Figure 8A:
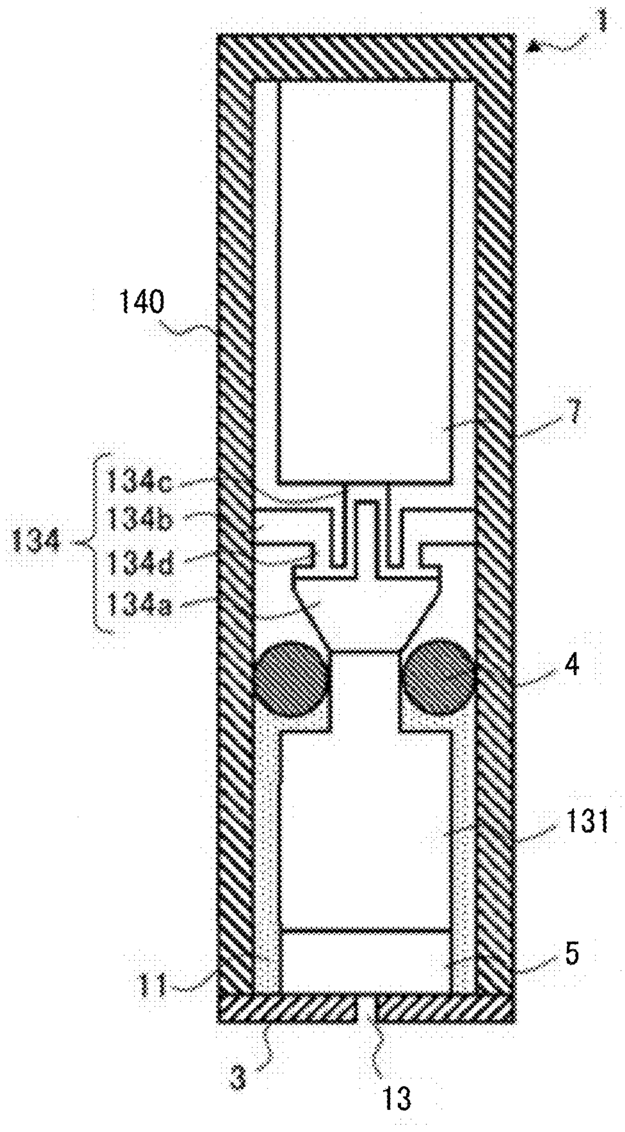
FIGS. 8A and 8B are schematic views of a discharge head according to a fourth embodiment of the present disclosure.
Figure 8B:
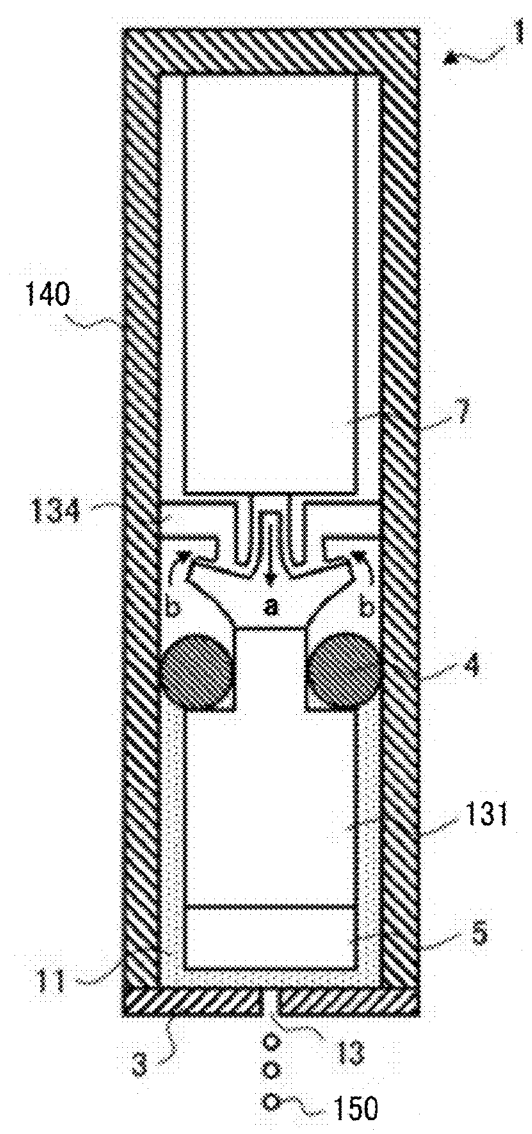

A fourth embodiment of the present disclosure is described below with reference to FIGS. 8A and 8B. FIGS. 8A and 8B are schematic views of a discharge head 1 according to the fourth embodiment of the present disclosure. FIG. 8A is a cross-sectional view of the discharge head 1 with the nozzle 13 closed, and FIG. 8B is a cross-sectional view of the discharge head 1 with the nozzle 13 opened.

The fourth embodiment is different from the above-described embodiments in that a reverse spring mechanism 134 as a transmission mechanism is disposed between a needle 131 including the needle valve 5 and the piezoelectric element 7. In the present embodiment, the piezoelectric element 7 has the property of expanding toward the nozzle plate 3 when a voltage is applied. A housing 140 in the present embodiment is described below. The housing 140 is divided into, for example, the housing-A 21, the housing-B 22, and the housing-C 23 as described in the first embodiment. In FIGS. 8A and 8B, the housing 140 is depicted in a single body for simplicity.

The reverse spring mechanism 134 is an elastic body formed of, for example, rubber, soft resin, or thin metal plate which is appropriately processed, to be deformable. The reverse spring mechanism 134 includes a deformable portion 134*a*, a secured portion 134*b*, a guide portion 134*c*, and a bent side 134*d*. The deformable portion 134*a* has a substantially trapezoidal cross-section. The deformable portion 134*a* contacts a base end (upper end in FIG. 8A) of the needle 131. The secured portion 134*b* is secured to the deformable portion 134*a* and the inner wall of the housing 140. The guide portion 134*c* couples the secured portion 134*b* and the piezoelectric element 7. The bent side 134*d* couples the long side (corresponding to the lower base of the trapezoid) of the trapezoidal deformable portion 134*a* and the secured portion 134*b*.

With the reverse spring mechanism 134 having the above-described configuration, the piezoelectric element 7 expands when a predetermined voltage is applied to the piezoelectric element 7. The guide portion 134*c* is pushed toward the nozzle 13 by the expanded piezoelectric element 7 in the direction indicated by arrow a in FIG. 8B. This pushing force causes the deformable portion 134*a* to be retracted in the direction away from the nozzle 13 (direction indicated by arrows b in FIG. 8B). In other words, the reverse spring mechanism 134 converts an expanding force of the piezoelectric element 7 into a retracting force to retract the needle 131, and then transmits the retracting force to the needle 131.

In the fourth embodiment, when a voltage is applied to the piezoelectric element 7, the piezoelectric element 7 expands, and accordingly the needle valve 5 as a valve body opens the nozzle 13. As a result, the discharge head 1 discharges liquid (liquid droplets) 150 from the nozzle 13. As described above, in the fourth embodiment, the reverse spring mechanism 134 is disposed between the needle 131 and the piezoelectric element 7. The reverse spring mechanism 134 converts the expanding force of the piezoelectric element 7 into the retracting force to retract the needle 131, which acts in the direction opposite to the expanding force, and then transmits the retracting force to the needle 131.

The reverse spring mechanism 134 described above can achieve the following effects. In the present embodiment, the housing-A 21 having the nozzles 13 and the housing-B 22 to be attached to the carriage 403 are separate bodies. Due to such a configuration, when the housing-B 22 is fastened to the carriage 403 by the screws 16, the influence of the compressive force of the fastening can be reduced, and the variations in the displacement of the needle valve 5 can be reduced. Further, the configuration in which the discharge head 1 includes the reverse spring mechanism 134 can largely displace the needle valve 5 by the small displacement of the piezoelectric element 7 as compared with the configuration without the reverse spring mechanism 134. Accordingly, since the displacement of the needle valve 5 is increased, the ratio of the displacement of the needle valve 5 to the deformation of the nozzle face due to screw fastening is increased. As a result, the sensitivity of the discharge speed due to the influence of the deformation by the screw fastening with respect to the change in the displacement is decreased. Thus, variations in the discharge speed can be further reduced. Specifically, for example, the variations in deformation of 5 μm with respect to the displacement of 10 μm can be changed to the variations in deformation of 5 μm with respect to the displacement of 30 μm by the reverse spring mechanism 134.

The discharge head 1 in the present embodiment includes the housings according to the first embodiment (i.e., the housing-A 21, the housing-B 22, and the housing-C 23). Alternatively, the discharge head 1 in the present embodiment may include the housings according to the second embodiment (i.e., the housing-A 21, the housing-D 31, and the housing-C 23) or the housings according to the third embodiment (i.e., the housing-E 37, the housing-B 22, and the housing-C 23) to achieve the same effects.

Fifth Embodiment

Figure 10:
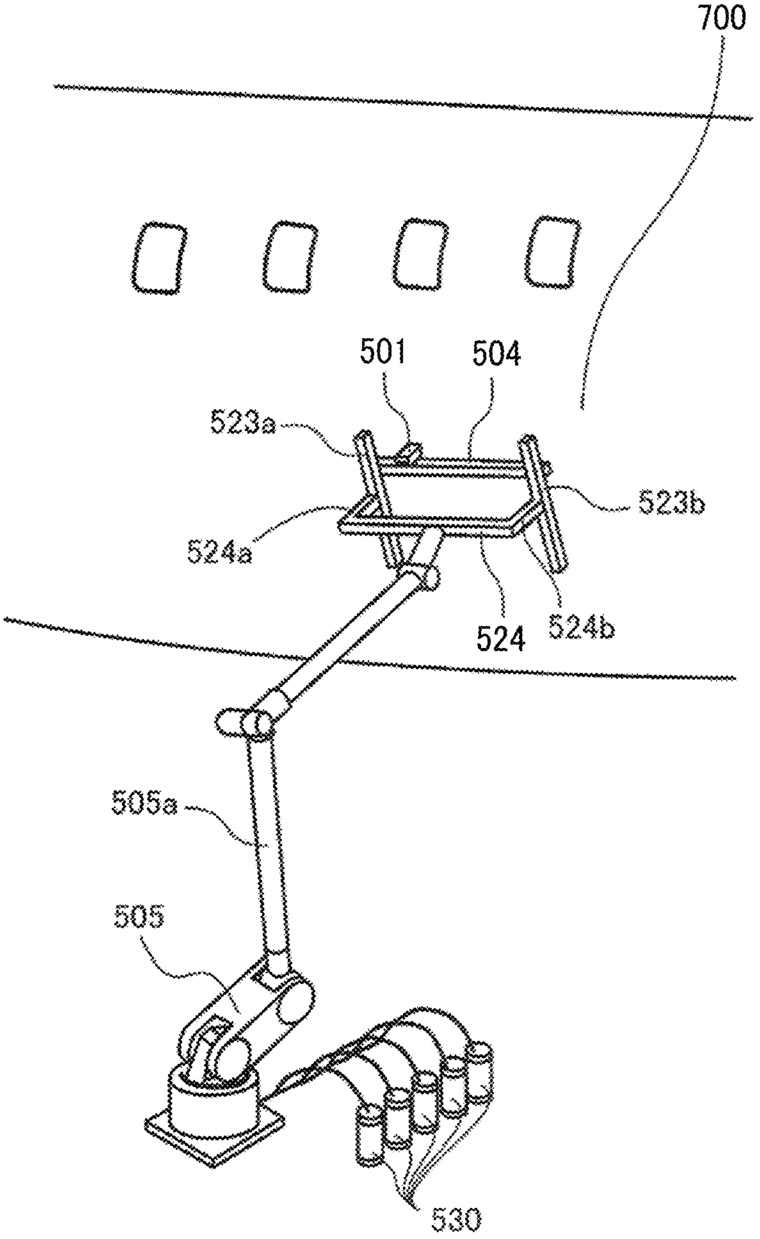
FIG. 10 is a schematic perspective view of the liquid discharge apparatus illustrated in FIG. 9.

A fifth embodiment of the present disclosure is described below with reference to FIGS. 9 and 10. FIG. 9 is a schematic view of a liquid discharge apparatus 500 according to embodiments of the present disclosure, which prints an image on a print object such as an aircraft. FIG. 10 is a schematic perspective view of the liquid discharge apparatus 5W in FIG. 9.

The liquid discharge apparatus 500 includes a linear rail 504 and a multi-articulated robot 505. The linear rail 504 linearly reciprocates the carriage 403 that is a moving body on which a discharge unit 501 including the discharge head 1 is mounted. The multi-articulated robot 505 appropriately moves the linear rail 504 to a predetermined position and holds the linear rail 504 at the position. The multi-articulated robot 505 includes a robot arm 505*a* that is freely movable like a human arm by a plurality of joints. The multi-articulated robot 505 can freely move a distal end of the robot arm 505*a* and arrange the distal end of the robot arm 505*a* at an accurate position.

An industrial robot of a six-axis control-type having, for example, six axes (i.e., six joints) can be used as the multi-articulated robot 505. The multi-articulated robot 505 of the six-axis control-type may previously learn data related to a movement of the multi-articulated robot 505 (i.e., teaching). As a result, the multi-articulated robot 505 can accurately and quickly position the linear rail 504 at a predetermined position facing a print object 700 (aircraft) on which an image is printed. The number of axes of the multi-articulated robot 505 is not limited to six, and a multi-articulated robot having an appropriate number of axes such as five axes or seven axes can be used.

The liquid discharge apparatus 500 includes a fork-shaped support 524, which is bifurcated into two, attached to the robot arm 505*a* of the multi-articulated robot 505. The liquid discharge apparatus 500 further includes a vertical linear rail 523*a* attached to a tip of a left branch 524*a* of the support 524, and a vertical linear rail 523*b* attached to a tip of a right branch 524*b* of the support 524. The vertical linear rail 523*a* and the vertical linear rail 523*b* are parallel to each other. Both ends of the linear rail 504 that movably holds the discharge unit 501 are supported so as to be bridged between the two vertical linear rails 523*a* and 523*b*.

The discharge unit 501 includes, for example, a plurality of discharge heads 1 that discharges liquids of different colors of black, cyan, magenta, yellow, and white, or a discharge head 1 having a plurality of nozzle arrays that discharges liquids of such different colors. Liquid of each color is supplied under pressure from a liquid tank 530 to each discharge head 1 of the discharge unit 501 or each nozzle array of the discharge head 1.

In the liquid discharge apparatus 500, the linear rail 504 is moved by the multi-articulated robot 505 to a position facing a desired printing area of the print object 700. The liquid discharge apparatus 500 performs printing by driving the piezoelectric element 7 of the discharge head 1 while moving the discharge unit 501 along the linear rail 504 according to the print data.

When printing of one line is completed, the vertical linear rails 523*a* and 523*b* are driven to move the discharge head 1 of the discharge unit 501 from one line to the next line. By repeating this operation, printing can be performed in a desired printing area of the print object 700.

Sixth Embodiment

Figure 12:
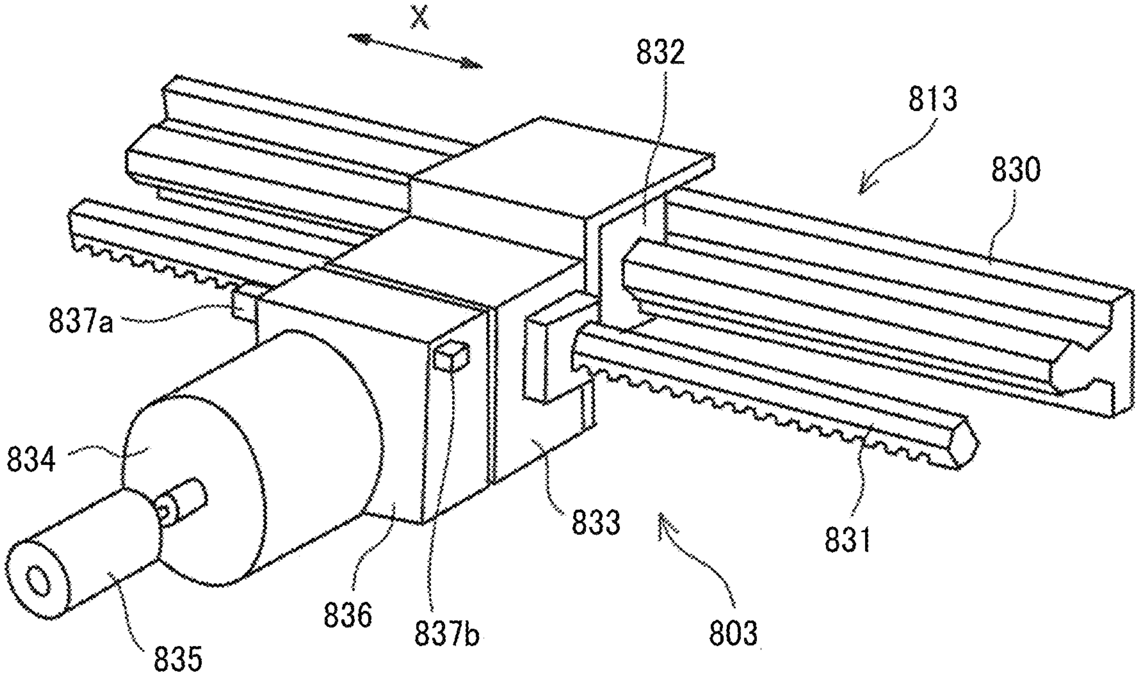
FIG. 12 is a schematic perspective view of a drive unit of the liquid discharge apparatus illustrated in FIG. 11.

A sixth embodiment of the present disclosure is described below with reference to FIGS. 11 and 12. FIG. 11 is a perspective view of a liquid discharge apparatus 500 according to the sixth embodiment. FIG. 12 is a perspective view of a drive unit 803 of the liquid discharge apparatus 500.

The liquid discharge apparatus 500 according to the present embodiment includes a movable frame unit 802 installed to face a print object 700 having a curved surface such as a hood of a vehicle. The frame unit 802 includes a left frame 810, a right frame 811, and a movable unit 813. The movable unit 813 is attached to the left frame 810 and the right frame 811 so that the movable unit 813 is bridged between the left frame 810 and the right frame 811. The movable unit 813 is vertically movable in the Y direction.

The movable unit 813 is provided with the drive unit 803 and the discharge unit 501. The drive unit 803 has a built-in motor and can reciprocate in a horizontal direction (i.e., the X direction) on the movable unit 813. The discharge unit 501 is attached to the drive unit 803 and discharges liquid toward the print object 700.

Further, the liquid discharge apparatus 500 includes a controller 805 and a data processing device 806. The controller 805 controls discharge of liquid from the discharge unit 501, a reciprocal movement of the drive unit 803, and a vertical movement of the movable unit 813. The data processing device 806 such as a personal computer (PC) sends instructions to the controller 805. The data processing device 806 is connected to a database (DB) unit 807 that records and stores data related to the print object 700 such as a shape and a size of the print object 700.

The frame unit 802 further includes an upper frame 808 and a lower frame 809 in addition to the left frame 810 and the right frame 811 that form a vertical and horizontal outline of the frame unit 802. The upper frame 808, the lower frame 809, the left frame 810, and the right frame 811 are formed of, for example, metal pipes. The frame unit 802 further includes a left leg 812*a* and a right leg 812*b* attached to both ends of the lower frame 809 to make the frame unit 802 to be freestanding. The left leg 812*a* and the right leg 812*b* are perpendicularly and horizontally attached to both the ends of the lower frame 809.

The movable unit 813 bridged between the left frame 810 and the right frame 811 is vertically movable while supporting the drive unit 803. A surface of the print object 700 is perpendicular to the direction of the liquid discharge (Z direction). Thus, the surface of the print object 700 faces a plane formed by the upper frame 808, the lower frame 809, the left frame 810, and the right frame 811 of the frame unit 802.

In this case, in order to arrange the print object 700 at a predetermined position at which printing is to be performed, the back side of a printing area of the print object 700 is sucked and held by, for example, a chuck attached to a distal end of a robot arm of a multi-articulated robot. By using the multi-articulated robot, the print object 700 can be accurately arranged at a printing position, and the posture of the print object 700 can be appropriately changed.

As illustrated in FIG. 12, the drive unit 803 is reciprocally movable in the horizontal direction (X direction) along the movable unit 813. The movable unit 813 includes a rail 830, a rack gear 831, a linear guide 832, a pinion gear 833, a motor 834, and a rotary encoder 835. The rail 830 is horizontally bridged between the left frame 810 and the right frame 811 of the frame unit 802. The rack gear 831 is parallel to the rail 830. The linear guide 832 is fitted on a part of the rail 830 and slidably moves along the rail 830. A pinion gear 833 is coupled to the linear guide 832 and meshes with the rack gear 831. The motor 834 includes a decelerator 836 and drives the pinion gear 833 to rotate. The rotary encoder 835 detects a position of a printing point.

Driving the motor 834 (to rotate forward or reverse) causes the discharge unit 501 to move in the right direction or the left direction along the movable unit 813. The drive unit 803 functions as a driving mechanism of the discharge unit 501 in the X direction. The decelerator 836 includes limit switches 837*a* and 837*b* attached to both sides of a case of the decelerator 836.

The discharge unit 501 includes, for example, a plurality of discharge heads 1 that discharges liquids of different colors of black, cyan, magenta, yellow, and white, or a discharge head 1 having a plurality of nozzle arrays that discharges liquids of such different colors. Liquid of each color is supplied under pressure from a liquid tank to each discharge head 1 of the discharge unit 501 or each nozzle array of the discharge head 1. In the liquid discharge apparatus 500, the movable unit 813 is moved in the Y direction and the discharge unit 501 is moved in the X direction to print a desired image on the print object 700.

Seventh Embodiment

Figure 14:
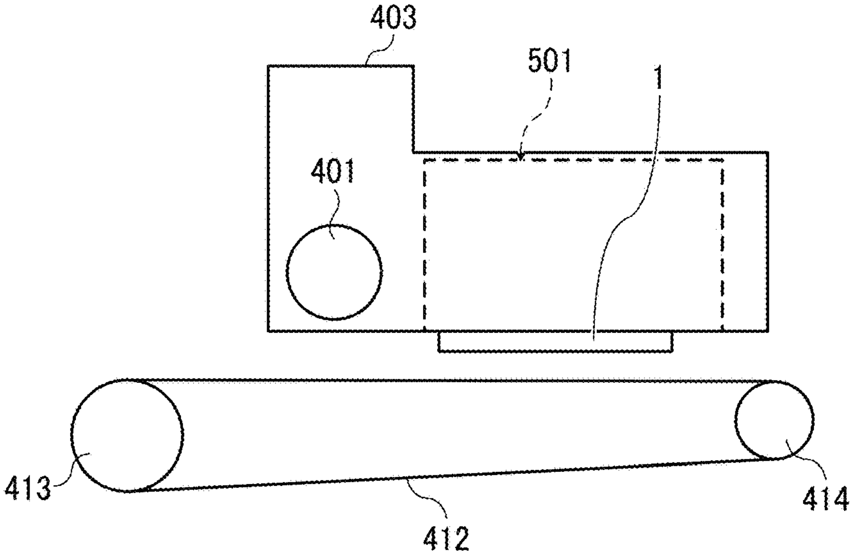
FIG. 14 is a schematic side view of the liquid discharge apparatus illustrated in FIG. 13.

A seventh embodiment of the present disclosure is described below with reference to FIGS. 13 and 14. FIG. 13 is a schematic plan view of a part of a liquid discharge apparatus 500 according to the seventh embodiment. FIG. 14 is a schematic side view of the part of the liquid discharge apparatus 500 in FIG. 13.

The liquid discharge apparatus 500 according to the present embodiment is a serial type printer, and a main-scanning moving mechanism 493 reciprocally moves a carriage 403 in a main scanning direction. The main-scanning moving mechanism 493 includes, for example, a guide 401, a main-scanning motor 405, and a timing belt 408. The guide 401 is bridged between left and right side plates 491A and 491B to moveably hold the carriage 403. The main-scanning motor 405 reciprocates the carriage 403 in the main scanning direction via the timing belt 408 looped around a drive pulley 406 and a driven pulley 407.

The discharge unit 501 including the discharge head 1 according to an embodiment of the present disclosure is mounted on the carriage 403. The discharge head 1 of the discharge unit 501 discharges liquids of different colors, for example, yellow (Y), cyan (C), magenta (M), and black (K).

The liquid discharge apparatus 500 includes a conveyance mechanism 495 to convey a sheet 410. The conveyance mechanism 495 includes a conveyance belt 412 as a conveyor and a sub-scanning motor 416 to drive the conveyance belt 412. The conveyance belt 412 attracts the sheet 410 and conveys the sheet 410 to a position facing the discharge head 1. The conveyance belt 412 is an endless belt stretched between a conveyance roller 413 and a tension roller 414. The sheet 410 can be attracted to the conveyance belt 412 by, for example, electrostatic attraction or air suction. The conveyance belt 412 circumferentially moves in a sub-scanning direction as the conveyance roller 413 is rotationally driven by the sub-scanning motor 416 via a timing belt 417 and a timing pulley 418.

On one end of the range of movement of the carriage 403 in the main scanning direction, a maintenance mechanism 420 that maintains and recovers the discharge head 1 is disposed lateral to the conveyance belt 412. The maintenance mechanism 420 includes, for example, a cap 421 to cap the nozzle face (i.e., a face on which the nozzles 13 are formed) of the discharge head 1 and a wiper 422 to wipe the nozzle face. The main-scanning moving mechanism 493, the maintenance mechanism 420, and the conveyance mechanism 495 are mounted onto a housing including the side plates 491A and 491B and a back plate 491C.

In the liquid discharge apparatus 500 having the above-described configuration, the sheet 410 is fed and attracted onto the conveyance belt 412 and conveyed in the sub-scanning direction by the circumferential movement of the conveyance belt 412. The discharge head 1 is driven in response to an image signal while the carriage 403 moves in the main scanning direction to discharge liquid onto the sheet 410 not in motion. As a result, an image is formed on the sheet 410.

OTHER EMBODIMENTS

Figure 15:
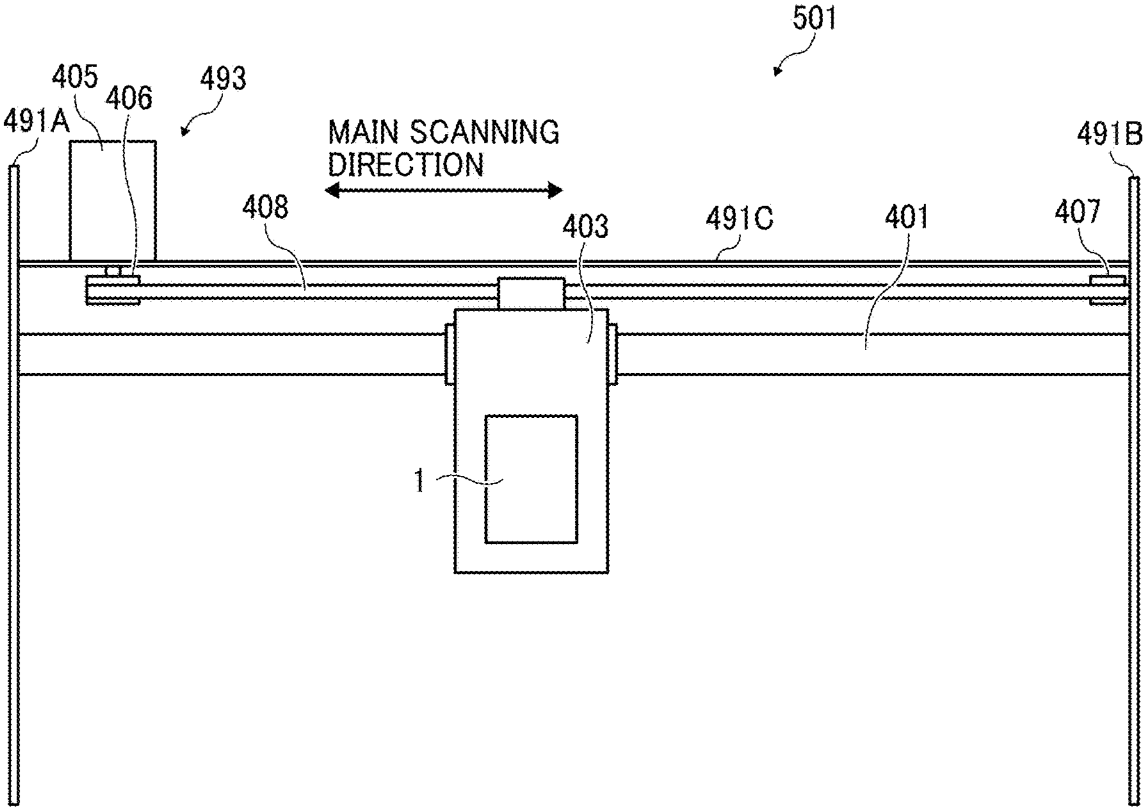
FIG. 15 is a schematic plan view of a discharge unit according to embodiments of the present disclosure.

A discharge unit according to another embodiment of the present disclosure is described below with reference to FIG. 15. FIG. 15 is a plan view of a part of the discharge unit. A discharge unit 501 illustrated in FIG. 15 includes the housing, the main-scanning moving mechanism 493, the carriage 403, and the discharge head 1 among components of the liquid discharge apparatus 500 described above. The side plates 491A and 491B, and the back plate 491C construct the housing. In the discharge unit 501, the maintenance mechanism 420 described above may be mounted on, for example, the side plate 491B.

Figure 16:
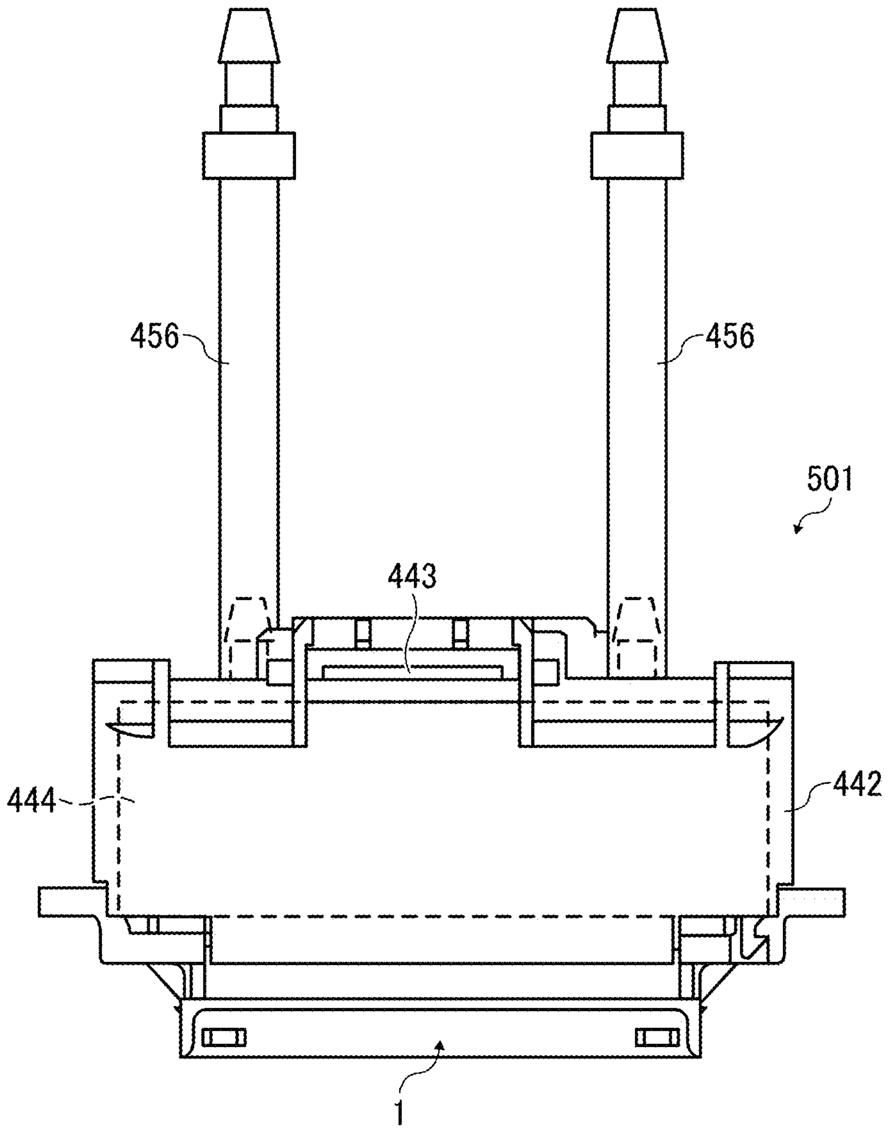
FIG. 16 is a schematic front view of another discharge unit according to embodiments of the present disclosure.

A discharge unit according to still another embodiment of the present disclosure is described below with reference to FIG. 16. FIG. 16 is a front view of the discharge unit. A discharge unit 501 illustrated in FIG. 16 includes the discharge head 1 to which a channel component 444 is attached, and a tube 456 connected to the channel component 444. The tube 456 supplies liquid to the discharge head 1 through the channel component 444. The channel component 444 is disposed inside a cover 442. A connector 443 for electrically connecting to the discharge head 1 is disposed on an upper portion of the channel component 444.

In the present disclosure, the liquid to be discharged is not limited to a particular liquid as long as the liquid has a viscosity or surface tension to be discharged from a discharge head (liquid discharge head). However, preferably, the viscosity of the liquid is not greater than 30 mPa·s under ordinary temperature and ordinary pressure or by heating or cooling. Examples of the liquid to be discharged include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric transducer element, such as a thermal resistor, and an electrostatic actuator including a diaphragm and a counter electrode.

The “discharge unit” is an assembly of parts relating to liquid discharge. The term “discharge unit” represents a structure including the discharge head and a functional part(s) or unit(s) combined with the discharge head as a single unit. For example, the “discharge unit” includes a combination of the discharge head with at least one of a head tank, a carriage, a supply mechanism, a maintenance mechanism, a main-scanning moving mechanism, and a liquid circulation device.

Herein, the terms “combined” or “integrated” mean attaching the discharge head and the functional parts (or mechanism) to each other by fastening, screwing, binding, or engaging and holding one of the discharge head and the functional parts to the other movably relative to the other. The discharge head, the functional parts, and the mechanism may also be detachably attached to one another.

For example, the discharge head and the head tank are integrated as the discharge unit. Alternatively, the discharge head may be coupled with the head tank through, for example, a tube to integrally form the discharge unit. A unit including a filter may further be added to a portion between the head tank and the discharge head of the discharge unit.

Examples of the discharge unit further include a discharge unit in which a discharge head and a carriage are integrated.

As another example, the discharge unit is a unit in which the discharge head and the main-scanning moving mechanism are combined into a single unit. The discharge head is movably held by a guide that is a part of the main-scanning moving mechanism. The discharge unit may include the discharge head, the carriage, and the main-scanning moving mechanism that are integrated as a single unit.

In yet another example, the cap that forms a part of the maintenance mechanism is secured to the carriage mounting the discharge head so that the discharge head, the carriage, and the maintenance mechanism are integrated as a single unit to form the discharge unit.

Further, in still another example, the discharge unit includes tubes connected to the discharge head mounting the head tank or the channel component so that the discharge head and the supply mechanism are integrated as a single unit. Through the tubes, the liquid in a liquid storage source is supplied to the discharge head.

The main-scanning moving mechanism may be a guide only. The supply mechanism as a liquid supply device may be a tube(s) only or a loading device only.

The term "liquid discharge apparatus" used herein also represents an apparatus including a discharge head or a discharge unit to drive the discharge head to discharge liquid. The liquid discharge apparatus may be, for example, any apparatus that can discharge liquid to a material onto which liquid can adhere or any apparatus to discharge liquid toward gas or into liquid.

The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers, so as to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

The liquid discharge apparatus may be an apparatus to relatively move the discharge head and the material onto which liquid can adhere. However, the liquid discharge apparatus is not limited to such an apparatus. For example, the liquid discharge apparatus may be a serial head apparatus that moves the discharge head or a line head apparatus that does not move the discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The "liquid discharge apparatus" is not limited to a configuration in which the discharge head is moved relative to an object onto which liquid is discharged. A configuration in which the discharge head and the object are movable relative to each other, for example, the object is moved relative to the liquid discharge head is applicable. In the description according to the above-described embodiments of the present disclosure, the discharge head is secured to the carriage or the movable unit of the liquid discharge apparatus by fastening of the screw. Alternatively, the discharge head can be secured by other methods if the discharge head is detachably attachable to, for example, the carriage. A method of securing the discharge head by a biasing member such as a spring instead of the screw can be used.

The terms "image formation," "recording," "printing," "image printing," and "fabricating" used in the present disclosure may be used synonymously with each other.

Electrode Manufacturing Apparatus

Figure 17:
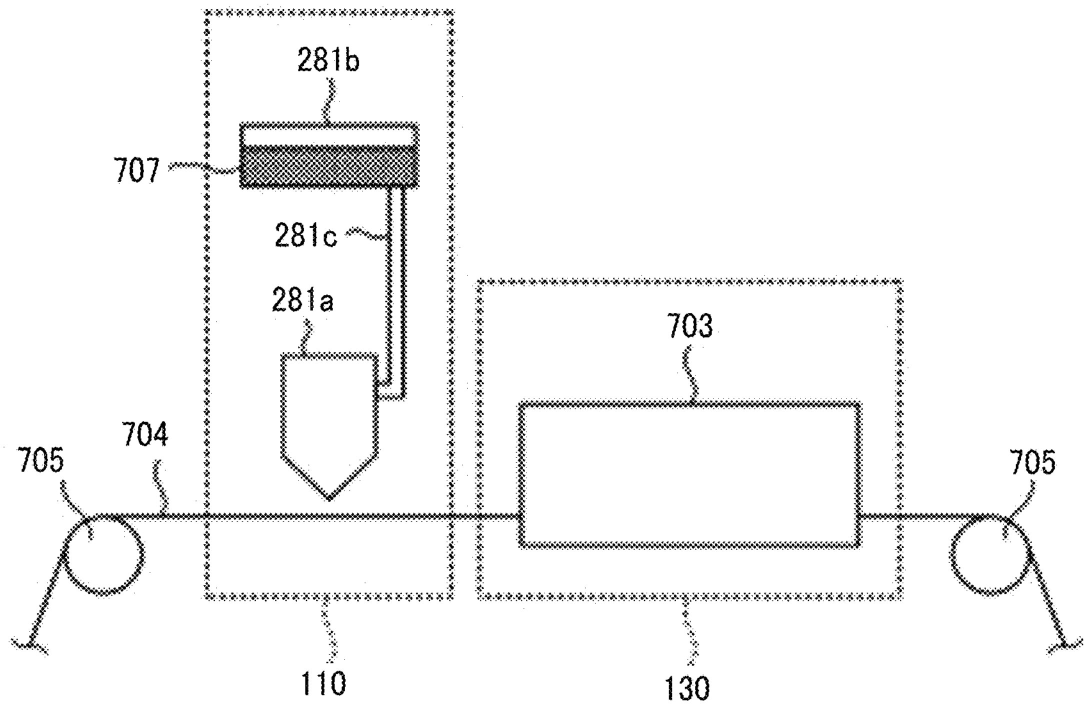
FIG. 17 is a schematic view of an electrode manufacturing apparatus for performing a method of manufacturing an electrode according to embodiments of the present disclosure.

Embodiments according to the present disclosure include apparatuses for manufacturing electrodes and electrochemical devices. An electrode manufacturing apparatus is described below. FIG. 17 is a schematic view of an electrode manufacturing apparatus according to an embodiment of the present disclosure. The electrode manufacturing apparatus uses the above-described liquid discharge apparatus to discharge a liquid composition in order to manufacture an electrode having a layer containing an electrode material.

Device to Form Layer Containing Electrode Material and Process of Forming Layer Containing Electrode Material A discharge device in the present embodiment is the above-described liquid discharge apparatus. The liquid discharge apparatus discharges and applies the liquid composition onto an object to form a liquid composition layer. The object is not limited to any particular object and can be suitably selected to suit to any application. The object is any object on which a layer containing an electrode material can be formed, such as an electrode substrate (current collector), an active material layer, and a layer containing a solid electrode material. The object may be referred to as an object onto which liquid is discharged or a discharge object in the following description. If the discharge device can form the layer containing the electrode material on the object on which liquid is discharged in a discharge process, the discharge device may directly discharge the liquid composition or may indirectly discharge the liquid composition to form the layer containing the electrode material.

Other Devices and Other Processes

Other devices in the electrode manufacturing apparatus, which forms an electrode composite layer, are not limited to any particular device and can be suitably selected to suit to any application as long as the effects of the present embodiment are not impaired. Examples of the device include a heating device. Other processes performed by the electrode manufacturing apparatus, which forms an electrode composite layer, are not limited to any particular process and can be suitably selected to suit to any application as long as the effects of the present embodiment are not impaired. Examples of the process include a heating process.

Heating Device and Heating Process

The heating device heats the liquid composition discharged by the discharge device. In the heating process, the liquid composition discharged in the discharge process is heated. The liquid composition layer can be dried by the heating.

Configuration in which Layer Containing Electrode Material is Formed by Directly Discharging Liquid Composition An electrode manufacturing apparatus according to an embodiment of the present disclosure, which forms an electrode composite layer containing an active material on an electrode substrate (current collector), is described below. The electrode manufacturing apparatus includes a discharge process unit 110 and a heating process unit 130. The discharge process unit 110 performs the discharge process in which the liquid composition is applied to a print base material 704 having the discharge object to form the liquid composition layer. The heating process unit 130 performs a heating process in which the liquid composition layer is heated to obtain the electrode composite layer.

The electrode manufacturing apparatus further includes a conveyance unit 705 that conveys the print base material 704. The conveyance unit 705 conveys the print base material 704, at a preset speed, to the discharge process unit 110 and the heating process unit 130 in this order. A method of producing the print base material 704 having the discharge object such as the active material layer is not limited to any particular method, and a known method can be appropriately selected. The discharge process unit 110 includes a printer 281*a* including the discharge head 1 according to the above-described embodiments, a storage container 281*b*, and a supply tube 281*c*. The printer 281*a* performs an application process of applying a liquid composition 707 onto the print base material 704. The storage container 281*b* stores the liquid composition 707. The supply tube 281*c* supplies the liquid composition 707 stored in the storage container 281*b* to the printer 281*a*.

The storage container 281*b* stores the liquid composition 707, and the discharge process unit 110 discharges the liquid composition 707 from the printer 281*a* to apply the liquid composition 707 onto the print base material 704 to form the liquid composition layer in a thin film shape. The storage container 281*b* may be integrated with the electrode manufacturing apparatus that forms the electrode composite layer or may be detachable from the electrode manufacturing apparatus. The storage container 281*b* includes a container for adding the liquid composition 707 to the storage container integrated with the electrode manufacturing apparatus or the storage container detachable from the electrode manufacturing apparatus. The storage container 281*b* that stably stores the liquid composition 707 and the supply tube 281*c* that stably supplies the liquid composition 707 can be used.

As illustrated in FIG. 17, the heating process unit 130 includes a heater 703 to perform a solvent removing process in which the solvent remaining in the liquid composition layer is heated and dried by the heater 703 to be removed. Thus, the electrode composite layer can be formed. The heating process unit 130 may perform the solvent removing process under reduced pressure.

The heater 703 is not limited to any particular device and can be suitably selected to suit to any application. Examples of the heater 703 include a substrate heating device, an infrared (IR) heater, and a hot-air heater, and the combination thereof. The heating temperature and time can be appropriately selected according to the boiling point of the solvent contained in the liquid composition 707 and the thickness of the formed film.

Figure 18:
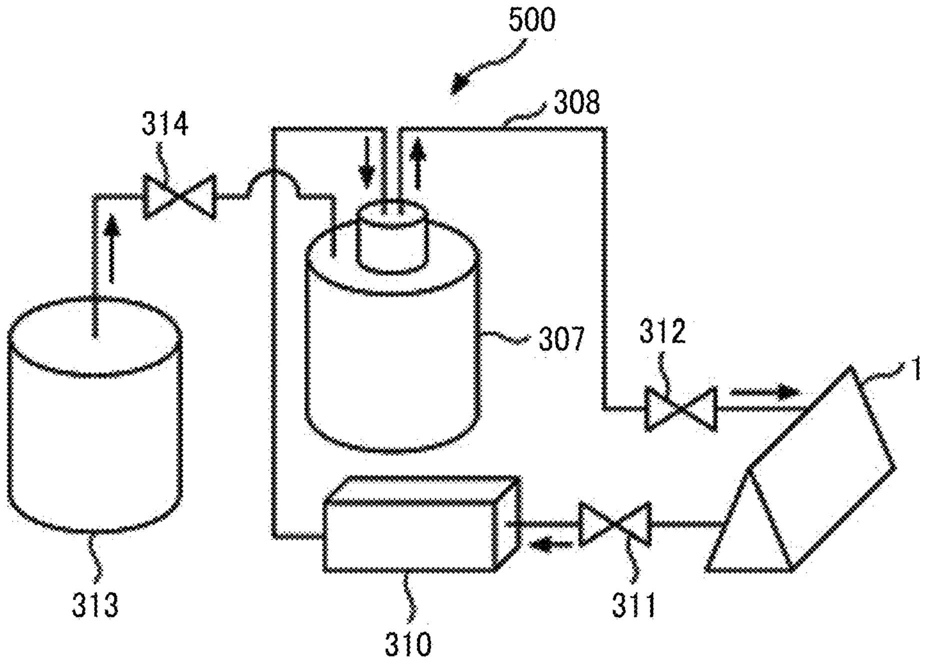
FIG. 18 is a schematic view of another electrode manufacturing apparatus for performing a method of manufacturing an electrode composite layer according to embodiments of the present disclosure.

FIG. 18 is a schematic view of another electrode manufacturing apparatus (liquid discharge apparatus) according to an embodiment of the present disclosure. A liquid discharge apparatus 500 controls a pump 310 and valves 311 and 312 to circulate a liquid composition through the discharge head 1 described above, a tank 307, and a tube 308. The liquid discharge apparatus 500 further includes an external tank 313. The liquid composition can be supplied from the external tank 313 to the tank 307 by controlling the pump 310, the valves 311 and 312, and a valve 314 when the amount of the liquid composition in the tank 307 decreases. When the electrode manufacturing apparatus according to the present embodiment is used, the liquid composition can be discharged to a target portion of the discharge object. The electrode composite layer can be suitably used, for example, as a part of the configuration of an electrochemical element. The configuration of the electrochemical element other than the electrode composite layer is not limited to any particular configuration and may be appropriately selected from known configurations. Examples thereof include a positive electrode, a negative electrode, and a separator.

The above-described embodiments of the present disclosure are examples, and the following aspects of the present disclosure can provide, for example, advantageous effects described below.

Aspect 1

A liquid discharge head (e.g., the discharge head 1) includes a first housing (e.g., the housing-A 21 or the housing-E 37), a valve body (e.g., the needle valve 5), and a second housing (e.g., the housing-B 22 or the housing-D 31). The first housing includes a nozzle (e.g., the nozzle 13) to discharge a liquid (e.g., ink) and a liquid chamber (e.g., the liquid chamber 11) to supply the liquid to the nozzle. The valve body is movable between a position at which the liquid is supplied from the liquid chamber to the nozzle and a position at which the liquid is blocked from being supplied from the liquid chamber to the nozzle. The second housing is held by the first housing on a side opposite to the nozzle side of the first housing in a moving direction (e.g., the z-direction) of the valve body (i.e., a valve moving direction). The second housing is held in a deformable state relative to the first housing. The second housing includes a fixing portion (e.g., the fastening screw hole-B 24 or the fastening screw hole-D 32) for securing the liquid discharge head to a discharge head support (e.g., the carriage 403 or the attachment plate 15 of the carriage 403) which supports the liquid discharge head.

In other words, a liquid discharge head includes a nozzle plate, a first housing, a valve body, and a second housing. The nozzle plate has a nozzle from which a liquid is dischargeable. The first housing has a first face fixed to the nozzle plate and has a liquid chamber communicating with the nozzle to supply the liquid to the nozzle. The valve body is movable between a liquid supply position and a liquid block position in a valve moving direction. The valve body at the liquid supply position separated from the nozzle allows the liquid flowing from the liquid chamber to the nozzle. The valve body at the liquid block position contacting the nozzle blocks the liquid flowing from the liquid chamber to the nozzle. The second housing is disposed over a second face of the first housing opposite to the first face in the valve moving direction. The second housing is deformable relative to the first housing. The second housing includes a fixing portion to be secured to a support of a liquid discharge apparatus to support the liquid discharge head.

Aspect 2

The liquid discharge head according to Aspect 1 further includes a third housing (e.g., the housing-C 23) disposed on a side of the second housing opposite to the first housing side in the moving direction of the valve body. The third housing holds the valve body. The second housing is held in a deformable state relative to the third housing.

In other words, the liquid discharge head further includes a third housing opposite the first housing via the second housing in the valve moving direction. The third housing includes a holder (e.g., the piezoelectric element holder 6) holds the valve body. The first housing and the second housing is fastened to the third housing. The second housing is deformable relative to the third housing.

Aspect 3

The liquid discharge head according to Aspect 2 further includes a mover (e.g., the piezoelectric element 7) secured to the third housing to support and move the valve body.

Aspect 4

In the liquid discharge head according to any one of Aspects 1 to 3, the second housing includes a held portion (e.g., the housing-AC fastening position 29) held by the first housing. The held portion is disposed on an inner side of the fixing portion in a direction (e.g., the x direction) orthogonal to the moving direction of the valve body.

In other words, the liquid discharge head further includes a fastening screw to fasten the first housing and the second housing to each other. The fastening screw is closer to a center of the second housing than the fixing portion in a planar direction of the second face of the first housing orthogonal to the valve moving direction.

Aspect 5

In the liquid discharge head according to Aspect 2, the second housing includes a held portion held by the first housing. The held portion is sandwiched between the first housing and the third housing. The held portion is disposed on an inner side of the fixing portion in a direction orthogonal to the moving direction of the valve body.

In other words, the liquid discharge head further includes a fastening screw to fasten the first housing, the second housing, and the third housing to each other. The fastening screw is closer to a center of the second housing than the fixing portion in a planar direction of the second face of the first housing orthogonal to the valve moving direction.

Aspect 6

In the liquid discharge head according to any one of Aspects 1 to 4, the liquid discharge head further includes an elastic member (e.g., the stress reliever 41) between the first housing and the second housing. The elastic member relieves stress applied to the first housing.

Aspect 7

The liquid discharge head according to any one of Aspects 2, 3 and 5 further includes a first elastic member (e.g., the stress reliever 41) between the first housing and the second housing and a second elastic member (e.g., the stress reliever 42) between the second housing and the third housing. The first elastic member relieves stress applied to the first housing. The second elastic member relieves stress applied to the third housing.

Aspect 8

In the liquid discharge head according to any one of Aspects 1 to 7, the second housing has a projection (e.g., the projecting portion 25) projecting from a side face of the first housing in a planar direction of the second face of the first housing orthogonal to the moving direction of the valve body. The fixing portion is disposed in the projection.

Aspect 9

In the liquid discharge head according to any one of Aspects 1 to 7, the fixing portion is disposed on a side face of the housing (i.e., the second housing) orthogonal to the second face of the first housing orthogonal to the moving direction of the valve body.

Aspect 10

In the liquid discharge head according to any one of Aspects 1 to 7, the first housing has an opening (e.g., the screw hole-E 38) in a region overlapping with the fixing portion in the moving direction of the valve body.

Aspect 11

A liquid discharge apparatus (e.g., the liquid discharge apparatus 500) includes the liquid discharge head according to any one of Aspects 1 to 10, the discharge head support to support the liquid discharge head, and a liquid supply device to supply the liquid to the liquid discharge head.

In other words, a liquid discharge apparatus includes the liquid discharge head according to any one of Aspects 1 to 10, a carriage movable in a direction orthogonal to the valve moving direction, and a liquid supply device to supply the liquid to the liquid discharge head. The carriage includes the support to which the liquid discharge head is detachably attached.

Aspect 12

A liquid discharge head includes a first housing, a valve body, a second housing, and a third housing. The first housing includes a nozzle to discharge a liquid and a liquid chamber to supply the liquid to the nozzle. The valve body is movable between a position at which the liquid is supplied from the liquid chamber to the nozzle and a position at which the liquid is blocked from being supplied from the liquid chamber to the nozzle. The second housing is held by the first housing on a side opposite to the nozzle side of the first housing in a moving direction of the valve body (i.e., a valve moving direction). The third housing is disposed on a side of the second housing opposite to the first housing side. The third housing holds the valve body. The second housing is held in a deformable state relative to the third housing. The second housing includes a fixing portion for securing the liquid discharge head to a discharge head support which supports the liquid discharge head.

In other words, a liquid discharge head includes a nozzle plate, a first housing, a valve body, a second housing, and a third housing. The nozzle plate has a nozzle from which a liquid is dischargeable. The first housing has a first face fixed to the nozzle plate and has a liquid chamber communicating with the nozzle to supply the liquid to the nozzle. The valve body is movable between a liquid supply position and a liquid block position in a valve moving direction. The valve body at the liquid supply position separated from the nozzle allows the liquid flowing from the liquid chamber to the nozzle. The valve body at the liquid block position contacting the nozzle blocks the liquid flowing from the liquid chamber to the nozzle. The second housing is disposed over a second face of the first housing opposite to the first face in the valve moving direction. The second housing includes a fixing portion to be secured to a support of a liquid discharge apparatus to support the liquid discharge head. The third housing is disposed opposite the first housing via the second housing in the valve moving direction. The third housing includes a holder holding the valve body. The first housing and the second housing are fastened to the third housing. The second housing is deformable relative to the first housing and the third housing.

Aspect 13

The liquid discharge head according to Aspect 12 further includes an elastic member (e.g., the stress reliever 42) between the second housing and the third housing. The elastic member relieves stress applied to the third housing.

Aspect 14

In the liquid discharge head according to Aspect 13, the liquid discharge head further includes another elastic member (e.g., the stress reliever 41) between the first housing and the second housing. The elastic member relieves stress applied to the first housing.

According to one aspect of the present disclosure, the liquid discharge head having multiple nozzles can reduce the variations in discharging performance caused by the deformation of the housing.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle plate having a nozzle from which a liquid is dischargeable;

a first housing having a first face fixed to the nozzle plate and having a liquid chamber communicating with the nozzle to supply the liquid to the nozzle;

a valve body movable between a liquid supply position and a liquid block position in a valve moving direction, the valve body;

at the liquid supply position separated from the nozzle to allow the liquid flowing from the liquid chamber to the nozzle; and at the liquid block position contacting the nozzle to block the liquid flowing from the liquid chamber to the nozzle; and a second housing over a second face of the first housing opposite to the first face in the valve moving direction, the second housing:

deformable relative to the first housing; and including a fixing portion to be secured to a support of a liquid discharge apparatus to support the liquid discharge head.

2. The liquid discharge head according to claim 1, further comprising a third housing opposite the first housing via the second housing in the valve moving direction, the third housing including a holder holding the valve body, wherein the first housing and the second housing are fastened to the third housing, and the second housing is deformable relative to the third housing.

3. The liquid discharge head according to claim 2, further comprising a mover secured to the third housing, the mover to support and move the valve body.

4. The liquid discharge head according to claim 1, further comprising a fastening screw to fasten the first housing and the second housing to each other, wherein the fastening screw is closer to a center of the second housing than the fixing portion in a planar direction of the second face of the first housing orthogonal to the valve moving direction.

5. The liquid discharge head according to claim 2, further comprising a fastening screw to fasten the first housing, the second housing, and the third housing to each other, wherein the fastening screw is closer to a center of the second housing than the fixing portion in a planar direction of the second face of the first housing orthogonal to the valve moving direction.

6. The liquid discharge head according to claim 1, further comprising an elastic member between the first housing and the second housing, the elastic member to relieve stress applied to the first housing.

7. The liquid discharge head according to claim 2, further comprising:

a first elastic member between the first housing and the second housing, the first elastic member to relieve stress applied to the first housing; and a second elastic member between the second housing and the third housing, the second elastic member to relieve stress applied to the third housing.

8. The liquid discharge head according to claim 1, wherein the second housing has a projection projecting from a side face of the first housing in a planar direction of the second face of the first housing orthogonal to the valve moving direction, and the projection includes the fixing portion.

9. The liquid discharge head according to claim 1, wherein the fixing portion is disposed on a side face of the second housing orthogonal to the second face of the first housing orthogonal to the valve moving direction.

10. The liquid discharge head according to claim 1, wherein the first housing has an opening in a region overlapping with the fixing portion of the second housing in the valve moving direction.

11. A liquid discharge apparatus comprising:

the liquid discharge head according to claim 1;

a carriage movable in a direction orthogonal to the valve moving direction, the carriage including the support to which the liquid discharge head is detachably attached; and a liquid supply device to supply the liquid to the liquid discharge head.

12. A liquid discharge head comprising:

a nozzle plate having a nozzle from which a liquid is dischargeable;

a first housing having a first face fixed to the nozzle plate and having a liquid chamber communicating with the nozzle to supply the liquid to the nozzle;

a valve body movable between a liquid supply position and a liquid block position in a valve moving direction, the valve body:

at the liquid supply position separated from the nozzle to allow the liquid flowing from the liquid chamber to the nozzle; and at the liquid block position contacting the nozzle to block the liquid flowing from the liquid chamber to the nozzle;

a second housing over a second face of the first housing opposite to the first face in the valve moving direction, the second housing including a fixing portion to be secured to a support of a liquid discharge apparatus to support the liquid discharge head; and a third housing opposite the first housing via the second housing in the valve moving direction, the third housing including a holder holding the valve body, wherein the first housing and the second housing are fastened to the third housing, and the second housing is deformable relative to the first housing and the third housing.

13. The liquid discharge head according to claim 12, further comprising an elastic member between the second housing and the third housing, the elastic member to relieve stress applied to the third housing.

14. The liquid discharge head according to claim 13, further comprising another elastic member between the first housing and the second housing to relieve stress applied to the first housing.

* * * * *